United States Patent
Asada et al.

(10) Patent No.: US 10,184,060 B2
(45) Date of Patent: *Jan. 22, 2019

(54) PIGMENT DISPERSION LIQUID, DECORATIVE MATERIAL, TRANSFER MATERIAL FOR FORMING DECORATIVE MATERIAL, SUBSTRATE WITH DECORATIVE MATERIAL, TOUCH PANEL, INFORMATION DISPLAY DEVICE, AND GRAFT TYPE SILICONE POLYMER

(71) Applicant: FUJIFILM Corporation, Tokyo (JP)

(72) Inventors: Saori Asada, Fujinomiya (JP); Hideki Kaneiwa, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,734

(22) Filed: Oct. 12, 2016

(65) Prior Publication Data

US 2017/0029648 A1 Feb. 2, 2017

Related U.S. Application Data

(63) Continuation of application No. PCT/JP2015/060536, filed on Apr. 3, 2015.

(30) Foreign Application Priority Data

May 7, 2014 (JP) ................ 2014-096332
Sep. 18, 2014 (JP) ................ 2014-190496

(51) Int. Cl.
| | |
|---|---|
| C09D 17/00 | (2006.01) |
| C08F 283/12 | (2006.01) |
| G06F 3/041 | (2006.01) |
| C08L 51/08 | (2006.01) |
| G06F 3/044 | (2006.01) |

(52) U.S. Cl.
CPC .......... *C09D 17/002* (2013.01); *C08F 283/12* (2013.01); *C08F 283/122* (2013.01); *C08F 283/124* (2013.01); *C08L 51/085* (2013.01); *C09D 17/003* (2013.01); *C09D 17/004* (2013.01); *C09D 17/005* (2013.01); *C09D 17/008* (2013.01); *G06F 3/041* (2013.01); *G06F 3/044* (2013.01)

(58) Field of Classification Search
CPC ................ C09D 17/002; C08G 77/28
See application file for complete search history.

(56) References Cited

U.S. PATENT DOCUMENTS

2004/0241126 A1* 12/2004 Sakuta ............ A61K 8/0212
424/70.12
2010/0130693 A1 5/2010 Yamada et al.
2013/0142748 A1 6/2013 Tamura et al.

FOREIGN PATENT DOCUMENTS

| CN | 103079538 A | 5/2013 |
|---|---|---|
| JP | 2004-231607 A | 8/2004 |
| JP | 2007-8884 A | 1/2007 |
| JP | 2008-274116 A | 11/2008 |
| JP | 2010-163390 A | 7/2010 |
| JP | 2012-46507 A | 3/2012 |

OTHER PUBLICATIONS

International Search Report issued in PCT/JP2015/060536, dated May 26, 2015.
Written Opinion of the International Searching Authority issued in PCT/JP2015/060536 (PCT/ISA/237), dated May 26, 2015.
English Translation of International Preliminary Report on Patentability (including PCT/IB/373 and PCT/ISA/237) for PCT/JP2015/060536,dated Nov. 8, 2018.
Chinese Office Action and Search Report for corresponding Application No. 201580020200.6, dated Mar. 14, 2018, with an English translation of the Office Action.

* cited by examiner

*Primary Examiner* — Kuo Liang Peng
(74) *Attorney, Agent, or Firm* — Birch, Stewart, Kolasch & Birch, LLP

(57) ABSTRACT

A pigment dispersion liquid includes a pigment dispersant; and a pigment, in which the pigment dispersant is a graft type silicone polymer denoted by General Formula 1. In General Formula 1, $R^1$ to $R^{10}$, $R^{15}$ and $R^{16}$ represent a hydrogen atom, a hydroxy group, an aryl group, or an alkyl group having 1 to 3 carbon atoms; $R^{11}$ and $R^{12}$ represent an arylene group or an alkylene group having 1 to 3 carbon atoms; Y and Z represent a single bond or a divalent organic linking group; A represents a group having a pigment adsorption portion; B represents a group having a structure denoted by General Formula 2; l and n represent an integer of greater than or equal to 1; m represents an integer of greater than or equal to 0; and k represents an integer of greater than or equal to 1.

General Formula 1

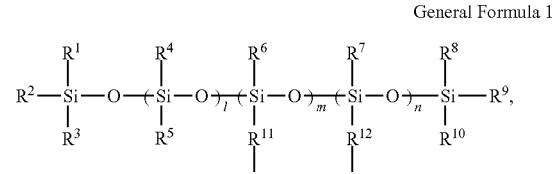

General Formula 2

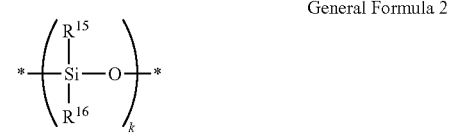

18 Claims, 7 Drawing Sheets

PIGMENT DISPERSION LIQUID, DECORATIVE MATERIAL, TRANSFER MATERIAL FOR FORMING DECORATIVE MATERIAL, SUBSTRATE WITH DECORATIVE MATERIAL, TOUCH PANEL, INFORMATION DISPLAY DEVICE, AND GRAFT TYPE SILICONE POLYMER

CROSS-REFERENCE TO RELATED APPLICATIONS

This application is a Continuation of PCT International Application No. PCT/JP2015/60536, filed on Apr. 3, 2015, which claims priority under 35 U.S.C. § 119(a) to Japanese Patent Application No. 2014-096332, filed on May 7, 2014 and Japanese Patent Application No. 2014-190496, filed on Sep. 18, 2014. Each of the above application(s) is hereby expressly incorporated by reference, in its entirety, into the present application.

BACKGROUND OF THE INVENTION

1. Field of the Invention

The present invention relates to a pigment dispersion liquid. Further, the present invention also relates to a decorative material and a transfer material for forming a decorative material using the pigment dispersion liquid, a substrate with a decorative material using the decorative material, and a touch panel using the decorative material and the substrate with a decorative material. In addition, the present invention also relates to an information display device including the touch panel. In addition, the present invention also relates to a graft type silicone polymer which is able to be used in the pigment dispersion liquid.

2. Description of the Related Art

In an electronic device such as a mobile phone, a car navigation system, a personal computer, a ticket vending machine, and a banking terminal, recently, a touch panel type input device has been disposed on the surface of a liquid crystal device or the like, and a finger, a touch pen, or the like is brought into contact with a portion in which an instruction image is displayed while referring to the instruction image displayed on an image display region of the liquid crystal device, and thus, information corresponding to the instruction image is input.

Such an input device (a touch panel) includes a resistive film type input device, a capacitance type input device, and the like. The capacitance type input device has an advantage in which a light transmissive conductive film may be simply formed on one substrate. In addition, the capacitance type input device has an advantage in which a light transmissive conductive film may be formed on one substrate. In a capacitance type touch panel of a cover glass integrated type (one glass solution: OGS) touch panel, a front plate is integrated with a capacitance type input device, and thus, a reduction in a thickness and a weight is able to be attained.

In such a capacitance type input device, in order to make a drawing circuit or the like of a display device invisible to a user and to make the visual quality excellent, a decorative material is formed into the shape of a frame surrounding an information display portion (also referred to as an image display portion and a light transmissive region) which is in contact with a finger, a touch pen, or the like, and thus, decoration is performed. A white decorative material is required as a decorative material for performing such decoration from the viewpoint of design or visual quality. In addition, the drawing circuit or the like of the display device is seen through with only the white decorative material, and thus, in order to make the drawing circuit or the like of the display device invisible to the user, a black decorative material (also referred to as a light shielding layer) or a decorative material colored with other colors is required to be used.

When a colored decorative material such as a white decorative material is manufactured, in general, a method using a pigment dispersion liquid is known. In order to increase the dispersibility of the pigment, a polymer compound may be added to the pigment dispersion liquid as a pigment dispersant.

On the other hand, in the cosmetics field, it is known that a graft type silicone polymer which has high solubility with respect to a volatile solvent having no skin irritancy is used as a polymer compound (refer to JP2008-274116A). Specifically, in JP2008-274116A, a graft type silicone polymer which contains (a) a mercapto modified silicone polymer and (b) a polymerization product of a radical polymerizable monomer component selected such that a solubility parameter of a polymerization product of only a radical polymerizable monomer component containing a (meth)acrylic acid and/or a (meth)acrylic acid alkyl ester becomes greater than or equal to 9.14 $(cal/cm^3)^{1/2}$, has a storage elastic modulus of greater than or equal to $1 \times 10^5$ Pa at a temperature of 37° C. and a frequency of 1 Hz, and is dissolved in decamethyl cyclopentasiloxane in the amount of greater than or equal to 1 weight % at 23° C., is disclosed. In addition, in JP2008-274116A, an example is disclosed in which titanium dioxide or the like is further mixed into such a graft type silicone polymer, and thus, sunscreen cream or liquid foundation which is an emulsion is obtained.

SUMMARY OF THE INVENTION

The present inventors have newly found that in a case where a decorative material of a capacitance type input device is manufactured by using a pigment dispersion liquid containing the graft type silicone polymer disclosed in JP2008-274116A and titanium dioxide as a white pigment, the dispersibility of the pigment is excellent, but coloration due to heating of a high temperature treatment step at the time of manufacturing a front plate integrated type touch panel occurs.

An object of the present invention is to provide a pigment dispersion liquid in which dispersibility of a pigment is excellent and heat resistance is excellent.

As a result of intensive studies of the present inventors for attaining the object described above, it has been found that it is possible to make dispersibility of a pigment and heat resistance compatible by using a graft type silicone polymer into which silicone is introduced not only as a main chain but also as a graft side chain as a pigment dispersant, and thus, the present invention has been completed.

Specifically, the present invention has the following configurations.

[1] A pigment dispersion liquid, containing: a pigment dispersant; and a pigment, in which the pigment dispersant is a graft type silicone polymer denoted by General Formula 1 described below;

General Formula 1

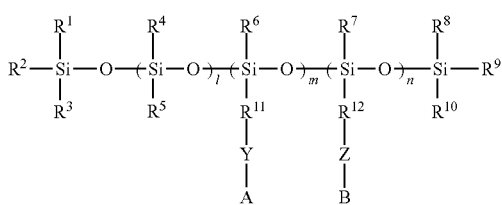

in General Formula 1, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, Y and Z each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 0; and General Formula 2

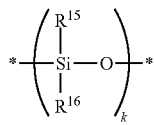

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

[2] In the pigment dispersion liquid according to [1], it is preferable that the pigment dispersant is a graft type silicone polymer denoted by General Formula 3 described below;

General Formula 3

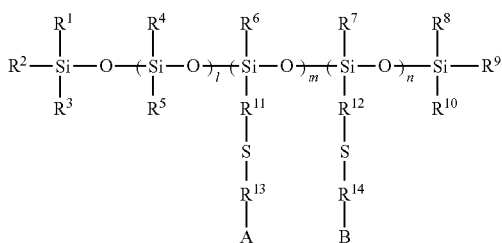

in General Formula 3, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 0; and General Formula 2

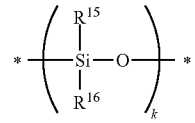

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

[3] In the pigment dispersion liquid according to [1] or [2], it is preferable that in General Formula 2 described above or General Formula 3 described above, m represents an integer of greater than or equal to 1.

[4] In the pigment dispersion liquid according to any one of [1] to [3], it is preferable that the pigment dispersant is a graft type silicone polymer denoted by General Formula 4 described below;

General Formula 4

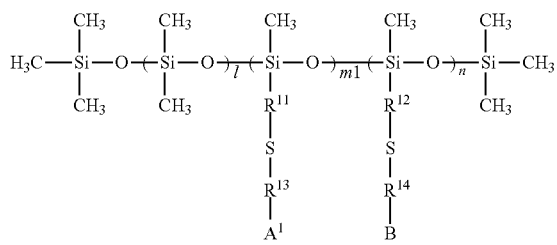

in General Formula 4, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption portion which includes at least one type of a portion selected from an acidic group, a group having a basic nitrogen atom, a urea group, a urethane group, a group having a coordinating oxygen atom, a hydrocarbon group having greater than or equal to 4 carbon atoms, a heterocyclic residue, an amide group, an alkoxy silyl group, an epoxy group, an isocyanate group, a hydroxy group, and a thiol group, B represents a group having a structure denoted by General Formula 2 described below, and l, m1, and n each independently represent an integer of greater than or equal to 1; and General Formula 2

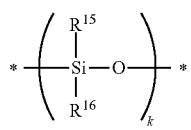

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

[5] In the pigment dispersion liquid according to any one of [1] to [4], it is preferable that the pigment is a white pigment or a black pigment.

[6] In the pigment dispersion liquid according to any one of [1] to [4], it is preferable that the pigment is titanium dioxide or carbon black.

[7] In the pigment dispersion liquid according to any one of [1] to [6], it is preferable that a content rate of the pigment with respect to the pigment dispersion liquid is 20 to 90 mass %.

[8] In the pigment dispersion liquid according to any one of [1] to [7], it is preferable that the pigment dispersion liquid further contains a silicone resin.

[9] In the pigment dispersion liquid according to any one of [1] to [8], it is preferable that the pigment dispersion liquid is used for forming a decorative material.

[10] A decorative material using the pigment dispersion liquid according to any one of [1] to [9].

[11] In the decorative material according to [10], it is preferable that the decorative material is used for a touch panel, and is a white decorative material.

[12] A transfer material for forming a decorative material, comprising: a colored layer using the pigment dispersion liquid according to any one of [1] to [9].

[13] A substrate with a decorative material, comprising: the decorative material according to [10] or [11]; and a substrate.

[14] A touch panel, comprising: the decorative material according to [10] or [11]; a decorative material using the transfer material for forming a decorative material according to [12]; or the substrate with a decorative material according to [13].

[15] An information display device, comprising: the touch panel according to [14].

[16] A graft type silicone polymer denoted by General Formula 4 described below;

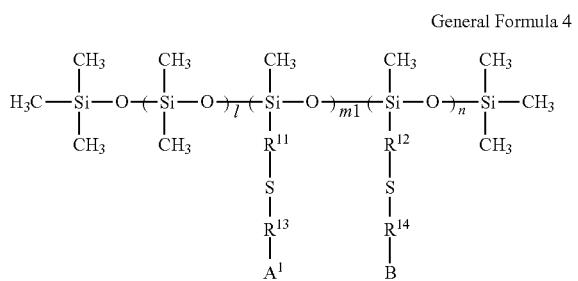

General Formula 4 in General Formula 4, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption portion which includes at least one type of a portion selected from an acidic group, a group having a basic nitrogen atom, a urea group, a urethane group, a group having a coordinating oxygen atom, a hydrocarbon group having greater than or equal to 4 carbon atoms, a heterocyclic residue, an amide group, an alkoxy silyl group, an epoxy group, an isocyanate group, a hydroxy group, and a thiol group, B represents a group having a structure denoted by General Formula 2 described below, and l, m1, and n each independently represent an integer of greater than or equal to 1; and

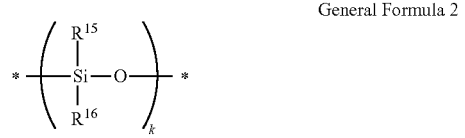

General Formula 2 in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

According to the present invention, it is possible to provide a pigment dispersion liquid in which dispersibility of a pigment is excellent and heat resistance is excellent.

DESCRIPTION OF THE PREFERRED EMBODIMENTS

Figure 1:
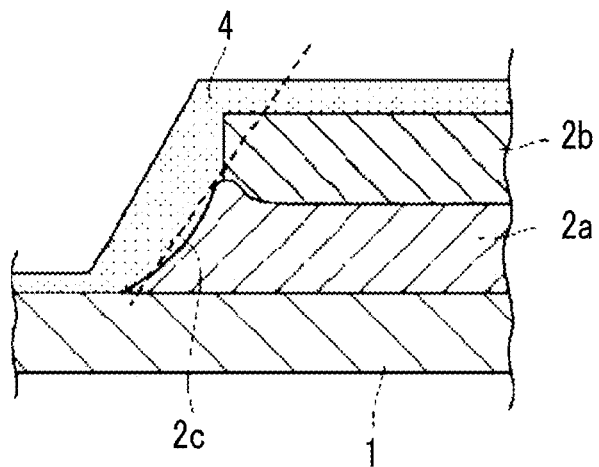
FIG. 1 is a partially enlarged sectional view illustrating one example of a decorative material.

Hereinafter, a pigment dispersion liquid, a decorative material, a transfer material for forming a decorative material, a substrate with a decorative material, a touch panel, an information display device, and a graft type silicone polymer of the present invention will be described in detail.

The description of configuration requirements described below is based on representative embodiments, but the present invention is not limited to the embodiments. Furthermore, herein, a numerical range denoted by using "to" indicates a range including numerical values before and after "to" as the lower limit value and the upper limit value.

[Pigment Dispersion Liquid]

A pigment dispersion liquid of the present invention is a pigment dispersion liquid containing a pigment dispersant, and a pigment, in which the pigment dispersant is a graft type silicone polymer denoted by General Formula 1 described below.

General Formula 1

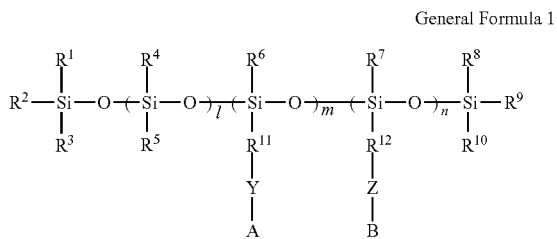

In General Formula 1, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, Y and Z each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 0; and General Formula 2

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

According to such a configuration, a pigment dispersion liquid is obtained in which dispersibility of a pigment is excellent and heat resistance is excellent.

Even though it is not bound by such theoretics, it is possible to increase heat resistance by using silicone in a mechanism where a ratio of an Si atom increases, and a ratio of an organic component is able to decrease, compared to a case of using a general graft type polymer which does not use silicone.

In addition, the graft type silicone polymer having a structure denoted by General Formula 1 has excellent affinity with respect to a dispersion solvent or a binder, and thus, it is also possible to increase dispersibility of a pigment, compared to a case of using a general graft type polymer which does not use silicone.

Further, the graft type silicone polymer having a structure denoted by General Formula 1 includes silicone not only in a main chain but also in a graft side chain, and thus, the ratio of the Si atom increases, and the ratio of the organic component is able to decrease, and thus, it is possible to increase heat resistance, compared to a graft type silicone polymer disclosed in JP2008-274116A in which mercapto modified silicone is included only in a main chain, but a graft side chain does not include silicone. In addition, it is considered that the affinity with respect to the dispersion solvent or the binder becomes excellent by steric repulsion between the silicone main chain and the silicone side chain, and thus, it is possible to increase dispersibility.

Hereinafter, a preferred aspect of the pigment dispersion liquid of the present invention will be described.

<Pigment Dispersant and Graft Type Silicone Polymer>

(Molecular Structure of Pigment Dispersant)

In the pigment dispersion liquid of the present invention, the pigment dispersant is the graft type silicone polymer denoted by General Formula 1 described below.

General Formula 1

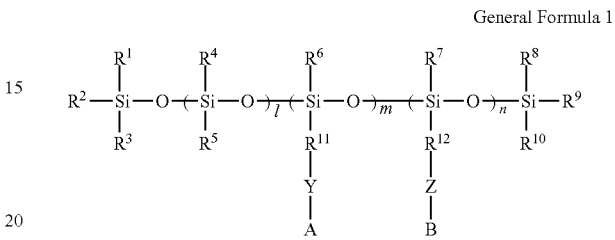

In General Formula 1, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, Y and Z each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 0; and General Formula 2

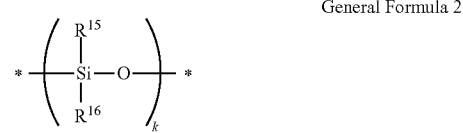

In General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

In General Formula 1, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, the aryl group or the alkyl group having 1 to 3 carbon atoms is preferable, and the alkyl group having 1 to 3 carbon atoms is more preferable.

Examples of the aryl group represented by $R^1$, $R^2$, $R^3$, $R^4$, $R^5$, $R^6$, $R^7$, $R^8$, $R^9$, and $R^{10}$ are able to include a phenyl group or a substituted phenyl group.

Examples of the alkyl group having 1 to 3 carbon atoms represented by $R^1$, $R^2$, $R^3$, $R^4$, $R^5$, $R^6$, $R^7$, $R^8$, $R^9$, and $R^{10}$ are able to include a methyl group, an ethyl group, an n-propyl group, and an i-propyl group, the methyl group and the ethyl group are preferable, and the methyl group is more preferable.

$R^1$, $R^2$, $R^3$, $R^4$, $R^5$, $R^6$, $R^7$, $R^8$, $R^9$, and $R^{10}$ may further have a substituent. For example, in a case where $R^1$, $R^2$, $R^3$, $R^4$, $R^5$, $R^6$, $R^7$, $R^8$, $R^9$, and $R^{10}$ represent a hydroxy group, an arbitrary alkyl group may be further included as a substituent, and thus, an alkoxy group may be formed. Here, it is preferable that $R^1$, $R^2$, $R^3$, $R^4$, $R^5$, $R^6$, $R^7$, $R^8$, $R^9$, and $R^{10}$ do not further have a substituent.

In General Formula 1 described above, in a case where l is greater than or equal to 2, one $R^4$ and one $R^5$ may be may be identical to each other or different from each other.

In a case where m is greater than or equal to 2, m $R^6$'s may be identical to each other or different from each other.

In a case where n is greater than or equal to 2, n $R^7$'s may be identical to each other or different from each other.

In General Formula 1, $R^{11}$ and $R^{12}$ each independently represent an arylene group or an alkylene group having 1 to 3 carbon atoms, and the alkylene group having 1 to 3 carbon atoms is preferable.

In a case where m is greater than or equal to 2, m $R^{11}$'s may be identical to each other or different from each other.

In a case where n is greater than or equal to 2, n $R^{12}$'s may be identical to each other or different from each other.

In General Formula 1, Y and Z each independently represent a single bond or a divalent organic linking group. In General Formula 1 described above, in a case where m is greater than or equal to 2, m Y's may be identical to each other or different from each other. In General Formula 1 described above, in a case where n is greater than or equal to 2, n Y's may be identical to each other or different from each other.

Examples of the divalent organic linking group represented by Y or Z include a group formed of 1 to 100 carbon atoms, 0 to 10 nitrogen atoms, 0 to 50 oxygen atoms, 1 to 200 hydrogen atoms, and 0 to 20 sulfur atoms, the divalent organic linking group may not be substituted or may further have a substituent.

Specific examples of the divalent organic linking group represented by Y or Z are able to include a group configured of structural units selected from a structural unit group G described below or a combination of the structural units.

A divalent organic linking group represented by Y or Z is preferable as the divalent organic linking group, and —S—, or a group configured of a combination between —S— and the structural unit selected from the structural unit group G described below is more preferable.

Examples of the divalent organic linking group represented by Y include —S—, or a group configured of a combination between —S— and the structural unit selected from the structural unit group G described below, and it is particularly preferable that —S— is bonded to $R^{11}$. Examples of the divalent organic linking group represented by Z include —S—, or a group configured of a combination between —S— and the structural unit selected from the structural unit group G described below, and it is particularly preferable that —S— is bonded to $R^{12}$.

Structural Unit Group G

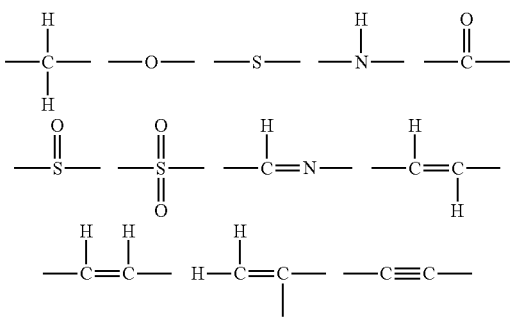

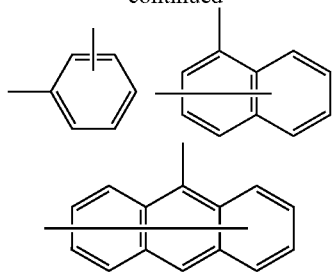

In General Formula 1, A represents a group having a pigment adsorption portion.

In a case where m is greater than or equal to 2, m A's may be identical to each other or different from each other.

A may have one pigment adsorption portion, or may have a plurality of pigment adsorption portions. In a case where A has a plurality of pigment adsorption portions, the plurality of pigment adsorption portions may be identical to each other or different from each other.

It is preferable that A, for example, is a monovalent organic group formed by bonding a pigment adsorption portion to an organic linking group configured of 1 to 200 carbon atoms, 0 to 20 nitrogen atoms, 0 to 100 oxygen atoms, 1 to 400 hydrogen atoms, and 0 to 40 sulfur atoms. In a case where the pigment adsorption portion itself is able to configure a monovalent organic group, it is natural that the pigment adsorption portion itself may be an organic group represented by A.

In the pigment dispersant of the present invention, it is preferable that the pigment adsorption portion described above includes at least one type of a portion selected from an acidic group, a group having a basic nitrogen atom, a urea group, a urethane group, a group having a coordinating oxygen atom, a hydrocarbon group having greater than or equal to 4 carbon atoms, a heterocyclic residue, an amide group, an alkoxy silyl group, an epoxy group, an isocyanate group, a hydroxy group, and a thiol group, it is more preferable that the pigment adsorption portion described above includes at least one type of a portion selected from an acidic group, a group having a basic nitrogen atom, a urea group, a group having a coordinating oxygen atom, a heterocyclic residue, an amide group, an alkoxy silyl group, a hydroxy group, and a thiol group, it is particularly preferable that the pigment adsorption portion described above includes at least one type of a portion selected from an acidic group and an alkoxy silyl group, and it is more particularly preferable that the pigment adsorption portion described above is a carboxylic acid group, a phosphoric acid group and a trimethoxy silyl group.

Examples of the acidic group represented by the pigment adsorption portion include a carboxylic acid group, a sulfonic acid group, a monosulfuric acid ester group, a phosphoric acid group (a phosphono group or the like), a phosphonooxy group, a monophosphoric acid ester group, and a boric acid group, the carboxylic acid group, the sulfonic acid group, the monosulfuric acid ester group, the phosphoric acid group, the phosphonooxy group, and the monophosphoric acid ester group are more preferable, and the carboxylic acid group, the sulfonic acid group, and the phosphoric acid group are particularly preferable.

Examples of the group having a basic nitrogen atom represented by the pigment adsorption portion include an amino group ($—NH_2$), a substituted imino group ($—NHR^{108}$, $—NR^{109}R^{110}$, here, $R^{108}$, $R^{109}$, and $R^{110}$ each independently represent an alkyl group having 1 to 20 carbon atoms, an aryl group having greater than or equal to 6 carbon atoms, and an aralkyl group having greater than or equal to 7 carbon atoms), a guanidyl group, an amidinyl group, and the like.

Examples of the urea group represented by the pigment adsorption portion include —$NR^{115}CONR^{116}R^{117}$ (here, $R^{115}$, $R^{116}$, and $R^{117}$ each independently represent a hydrogen atom or an alkyl group having 1 to 20 carbon atoms, an aryl group having greater than or equal to 6 carbon atoms, and an aralkyl group having greater than or equal to 7 carbon atoms), —$NR^{115}CONHR^{117}$ (here, $R^{115}$ and $R^{117}$ each independently represent a hydrogen atom or an alkyl group having 1 to 10 carbon atoms, an aryl group having greater than or equal to 6 carbon atoms, and an aralkyl group having greater than or equal to 7 carbon atoms) is more preferable, and —$NHCONHR^{117}$ (here, $R^{117}$ represents a hydrogen atom or an alkyl group having 1 to 10 carbon atoms, an aryl group having greater than or equal to 6 carbon atoms, and an aralkyl group having greater than or equal to 7 carbon atoms) is particularly preferable.

Examples of the urethane group represented by the pigment adsorption portion include —$NHCOOR^{118}$, —$NR^{119}COOR^{120}$, —$OCONHR^{121}$, —$OCONR^{122}R^{123}$ (here, $R^{118}$, $R^{119}$, $R^{120}$, $R^{121}$, $R^{122}$ and $R^{123}$ each independently represent an alkyl group having 1 to 20 carbon atoms, an aryl group having greater than or equal to 6 carbon atoms, and an aralkyl group having greater than or equal to 7 carbon atoms), and the like, —$NHCOOR^{118}$, —$OCONHR^{121}$ (here, $R^{118}$ and $R^{121}$ each independently represent an alkyl group having 1 to 20 carbon atoms, an aryl group having greater than or equal to 6 carbon atoms, and an aralkyl group having greater than or equal to 7 carbon atoms), and the like are preferable, —$NHCOOR^{118}$, —$OCONHR^{121}$ (here, $R^{118}$ and $R^{121}$ each independently represent an alkyl group having 1 to 10 carbon atoms, an aryl group having greater than or equal to 6 carbon atoms, and an aralkyl group having greater than or equal to 7 carbon atoms) and the like are more preferable.

Examples of the group having a coordinating oxygen atom represented by the pigment adsorption portion include an acetyl acetonate group, crown ether, and the like.

Examples of the hydrocarbon group having greater than or equal to 4 carbon atoms represented by the pigment adsorption portion include an alkyl group having greater than or equal to 4 carbon atoms, an aryl group having greater than or equal to 6 carbon atoms, an aralkyl group having greater than or equal to 7 carbon atoms, and the like, an alkyl group having 4 to 20 carbon atoms, an aryl group having 6 to 20 carbon atoms, an aralkyl group having 7 to 20 carbon atoms, and the like are preferable, an alkyl group having 4 to 15 carbon atoms (for example, an octyl group, a dodecyl group, and the like), an aryl group having 6 to 15 carbon atoms (for example, a phenyl group, a naphthyl group, and the like), an aralkyl group having 7 to 15 carbon atoms (for example, a benzyl group and the like), and the like are particularly preferable.

Examples of the heterocyclic residue represented by the pigment adsorption portion include thiophene, furan, xanthene, pyrrole, pyrroline, pyrrolidine, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone, anthraquinone, and the like.

Examples of the amide group represented by the pigment adsorption portion include —$CONHR^{124}$ (here, $R^{124}$ represents an alkyl group having 1 to 20 carbon atoms, an aryl group having greater than or equal to 6 carbon atoms, and an aralkyl group having greater than or equal to 7 carbon atoms), and the like.

Examples of the alkoxy silyl group represented by the pigment adsorption portion include a trimethoxy silyl group, a triethoxy silyl group, and the like.

Examples of another available aspect of the organic group having a pigment adsorption portion are disclosed in <0016> to <0046> of JP2013-43962A, and <0016> to <0046> of JP2013-43962A are incorporated in the present invention.

In General Formula 1, B represents a group having a structure denoted by General Formula 2.

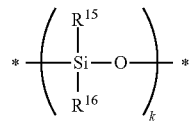

General Formula 2

In General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

It is preferable that $R^{15}$ and $R^{16}$ are each independently an alkyl group having 1 to 3 carbon atoms, it is more preferable that $R^{15}$ and $R^{16}$ are each independently a methyl group or an ethyl group, and it is particularly preferable that $R^{15}$ and $R^{16}$ are each independently a methyl group.

k represents an integer of greater than or equal to 1, is preferably 2 to 300, and is more preferably 10 to 200.

B has a structure denoted by General Formula 2. It is preferable that the structure denoted by General Formula 2 is a structure derived from a silicone-based monomer. B may be independently the structure derived from the silicone-based monomer, or a combination between B and $R^{14}$ may be the structure derived from the silicone-based monomer. The silicone-based monomer may be a silicone-based macromer. Furthermore, herein, the "macromer (also referred to as a macro monomer)" is a general term for an oligomer (a degree of polymerization of approximately from 2 to 300) or a polymer having a polymerizable functional group, and has properties of both of a polymer and a monomer. It is preferable that the structure denoted by General Formula 2 described above is a structure derived from a silicone-based macromer having a weight-average molecular weight of 1,000 to 50,000 (more preferably 1,000 to 10,000, and even more preferably 1,000 to 5,000).

Further, it is preferable that the polymer described above is soluble in an organic solvent. In a case where affinity with respect to the organic solvent is high, for example, affinity with respect to a dispersion medium is strong in a case of being used as a dispersant, and thus, an adsorption layer which is sufficient for dispersion stabilization is easily ensured.

Examples of the group having a structure denoted by General Formula 2 are able to include groups derived from X-22-174ASX, X-22-174BX, KF-2012, and X-22-173BX X-22-3710 which are manufactured by Shin-Etsu Chemical Co., Ltd., and the like.

In General Formula 1, l represents an integer of greater than or equal to 1, is preferably 1 to 100, is more preferably 1 to 60, and is particularly preferably 1 to 30.

In General Formula 1, m represents an integer of greater than or equal to 0, is preferably an integer of greater than or equal to 1 from the viewpoint of increasing dispersibility of a pigment, is more preferably 1 to 60, and is particularly preferably 1 to 30.

In General Formula 1, n represents an integer of greater than or equal to 1, is preferably 1 to 100, is more preferably 1 to 60, and is particularly preferably 1 to 30.

In the pigment dispersant, a ratio of a content of each partial structure of the graft type silicone polymer denoted by General Formula 1 is not particularly limited. That is, in General Formula 1, ratios of l, m, and n are not particularly limited.

In the pigment dispersion liquid of the present invention, in General Formula 1, it is preferable that m represents an integer of greater than or equal to 1.

In the pigment dispersion liquid of the present invention, in the graft type silicone polymer denoted by General Formula 1, it is more preferable that the pigment dispersant is a graft type silicone polymer denoted by General Formula 3 described below.

General Formula 3

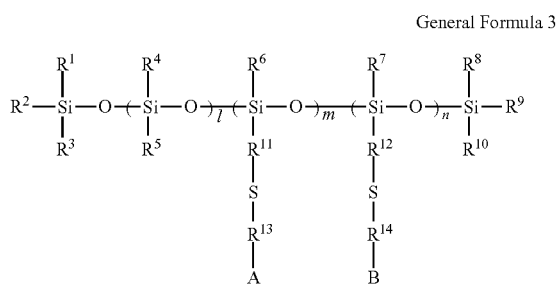

In General Formula 3, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 0; and General Formula 2

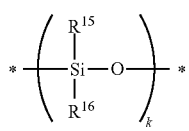

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

The definitions and the preferred ranges of $R^1$ to $R^{10}$, $R^{11}$ and $R^{12}$, B, and l and n in General Formula 3 are respectively identical to the definitions and the preferred ranges of $R^1$ to $R^{10}$, $R^{11}$ and $R^{12}$, B, and l and n in General Formula 1.

The preferred ranges of A and m in General Formula 3 are respectively identical to the preferred ranges of A and m in General Formula 1.

In General Formula 3, $R^{13}$ and $R^{14}$ each independently represent a single bond or a divalent organic linking group. In General Formula 1 described above, in a case where m is greater than or equal to 2, m $R^{13}$'s may be identical to each other or different from each other. In General Formula 1 described above, in a case where n is greater than or equal to 2, n $R^{14}$'s may be identical to each other or different from each other.

Examples of the divalent organic linking group represented by $R^{13}$ or $R^{14}$ include a group formed of 1 to 100 carbon atoms, 0 to 10 nitrogen atoms, 0 to 50 oxygen atoms, 1 to 200 hydrogen atoms, and 0 to 20 sulfur atoms, and the divalent organic linking group may not be substituted or may further have a substituent.

Specific examples of the divalent organic linking group represented by $R^{13}$ or $R^{14}$ are able to include a group configured of structural units selected from a structural unit group G described below or a combination of the structural units.

Structural Unit Group G

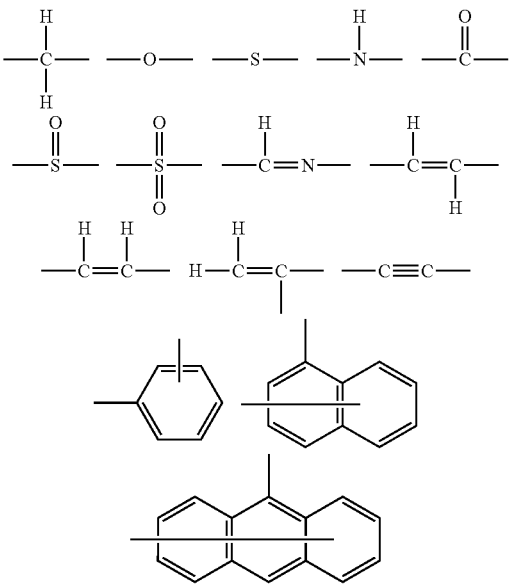

$R^{13}$ or $R^{14}$ is preferably a single bond, or a divalent organic linking group formed of 1 to 50 carbon atoms, 0 to 8 nitrogen atoms, 0 to 25 oxygen atoms, 1 to 100 hydrogen atoms, and 0 to 10 sulfur atoms, is more preferably a single bond, or a divalent organic linking group formed of 1 to 30 carbon atoms, 0 to 6 nitrogen atoms, 0 to 15 oxygen atoms, 1 to 50 hydrogen atoms, and 0 to 7 sulfur atoms, and is particularly preferably a single bond, or a divalent organic linking group formed of 1 to 10 carbon atoms, 0 to 5 nitrogen atoms, 0 to 10 oxygen atoms, 1 to 30 hydrogen atoms, and 0 to 5 sulfur atoms.

It is preferable that $R^{13}$ or $R^{14}$ is a single bond, or a divalent organic linking group formed of "1 to 10 carbon atoms, 0 to 5 nitrogen atoms, 0 to 10 oxygen atoms, 1 to 30 hydrogen atoms, and 0 to 5 sulfur atoms" which is configured of structural units selected from the structural unit group G described above or a combination of the structural units, (the divalent organic linking group may have a substituent, and examples of the substituent include an alkyl group having 1 to 20 carbon atoms such as a methyl group and an ethyl group, an aryl group having 6 to 16 carbon atoms such as a phenyl group and a naphthyl group, an acyl oxy group having 1 to 6 carbon atoms such as a hydroxyl group, an amino group, a carboxyl group, a sulfone amide group, an N-sulfonyl amide group, and an acetoxy group, an alkoxy group having 1 to 6 carbon atoms such as a methoxy group and an ethoxy group, a halogen atom such as chlorine and bromine, an alkoxy carbonyl group having 2 to 7 carbon atoms such as a methoxy carbonyl group, an ethoxy carbonyl group, and a cyclohexyl oxy carbonyl group, a carbonic acid ester group such as a cyano group and t-butyl carbonate, and the like).

It is preferable that $R^{13}$ is a divalent organic linking group denoted by $-(CH_2)-CH(R^{13A})-$. $R^{13A}$ represents a hydrogen atom or an alkyl group having 1 to 3 carbon atoms. It is preferable that $R^{13A}$ is a hydrogen atom or a methyl group. $R^{13A}$ may further have a substituent, and in a case where $R^{13A}$ has a substituent, a carboxyl group is preferable as the substituent.

It is preferable that $R^{14}$ is a divalent organic linking group denoted by $-(CH_2)-CH(R^{14A})-C(=O)-O-(C_pH_{2p})-$. $R^{14A}$ represents a hydrogen atom or an alkyl group having 1 to 3 carbon atoms, and p represents an integer of greater than or equal to 0. It is preferable that $R^{14A}$ is a hydrogen atom or a methyl group. $R^{14A}$ may further have a substituent. It is preferable that p is an integer of greater than or equal to 1.

The graft type silicone polymer denoted by General Formula 1 or 3 may have other repeating units in addition to l, m, n, and k repeating units, and it is preferable that the graft type silicone polymer does not have the other repeating units.

Examples of the other repeating units are able to include other repeating units having a pigment adsorption portion other than A. For example, the graft type silicone polymer denoted by General Formula 1 or 3 may have a repeating unit having a (unreacted) thiol group denoted by General Formula 5 described below.

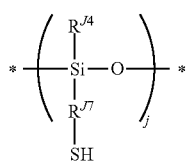

General Formula 5

In General Formula 5, $R^{J4}$ and $R^{J7}$ each independently represent a hydrogen atom, a hydroxy group, an aryl group, or an alkyl group having 1 to 3 carbon atoms, and j represents an integer of greater than or equal to 0.

The preferred ranges $R^{J4}$ and $R^{J7}$ are respectively identical to the preferred ranges of $R^4$ and $R^7$.

It is preferable that j is 0.

Examples of a polymer having a repeating unit which has a thiol group denoted by General Formula 5, KF-2001 (manufactured by Shin-Etsu Chemical Co., Ltd.), A-2, KF-2004 (manufactured by Shin-Etsu Chemical Co., Ltd.), and the like.

In the pigment dispersion liquid of the present invention, in the graft type silicone polymer denoted by General Formula 3, it is more preferable that the pigment dispersant is a graft type silicone polymer denoted by General Formula 4 described below.

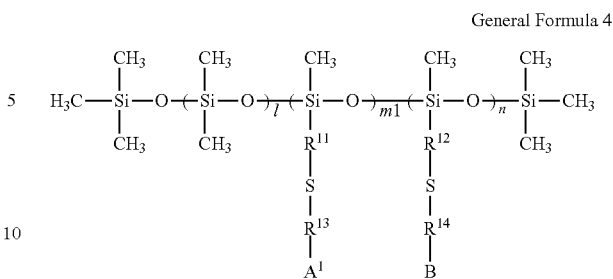

General Formula 4

In General Formula 4, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption portion which includes at least one type of a portion selected from an acidic group, a group having a basic nitrogen atom, a urea group, a urethane group, a group having a coordinating oxygen atom, a hydrocarbon group having greater than or equal to 4 carbon atoms, a heterocyclic residue, an amide group, an alkoxy silyl group, an epoxy group, an isocyanate group, a hydroxy group, and a thiol group, B represents a group having a structure denoted by General Formula 2 described below, and l, m1, and n each independently represent an integer of greater than or equal to 1; and

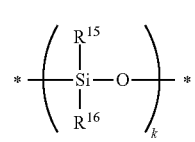

General Formula 2 in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

The graft type silicone polymer denoted by General Formula 4 is a novel polymer. The graft type silicone polymer denoted by General Formula 4 also indicates a graft type silicone polymer of the present invention.

The definitions and the preferred ranges of $R^{11}$, $R^{12}$, $R^{13}$, $R^{14}$, B, l, and n in General Formula 4 are respectively identical to the definitions and the preferred ranges of $R^{11}$, $R^{12}$, $R^{13}$, $R^{14}$, B, l, and n in General Formula 3.

The preferred ranges $A^1$ and m1 in General Formula 4 are respectively identical to the preferred ranges A and m in General Formula 1.

(Manufacturing Method of Pigment Dispersant)

A manufacturing method of the pigment dispersant described above is not particularly limited.

For example, it is possible to synthesize the pigment dispersant by a combination of a compound A which is mercapto modified silicone, a compound B which is a silicone macro monomer, and a compound C which is a macro monomer having a pigment adsorption portion described below, and for example, it is possible to synthesize the pigment dispersant by Scheme 1 described below. Furthermore, in Scheme 1 described below, an example using the compound B and the compound C which are macro monomers (specifically, a radical polymerizable monomer, more specifically, a (meth)acrylic monomer) is described, the manufacturing method of the pigment dispersant described above is not limited to such a manufacturing method.

In the compounds A, B, and C, and Scheme 1, $R^1$, $R^2$, $R^3$, $R^4$, $R^5$, $R^6$, $R^7$, $R^8$, $R^9$, $R^{10}$, $R^{11}$, $R^{12}$, l, m, and n are identical to $R^1$, $R^2$, $R^3$, $R^4$, $R^5$, $R^6$, $R^7$, $R^8$, $R^9$, $R^{10}$, $R^{11}$, $R^{12}$, l, m, and n in General Formula 1, p is an integer of greater than or equal to 0, k is an integer of greater than or equal to 1, $R^B$ is an arbitrary substituent, R and X each represent a substituent in Table 1 described below, and V-601 is dimethyl-2,2'-azobis(2-methyl propionate) which is one example of a polymerization initiator.

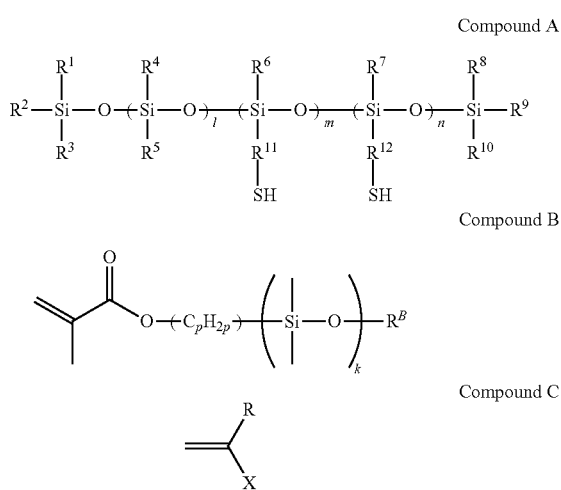

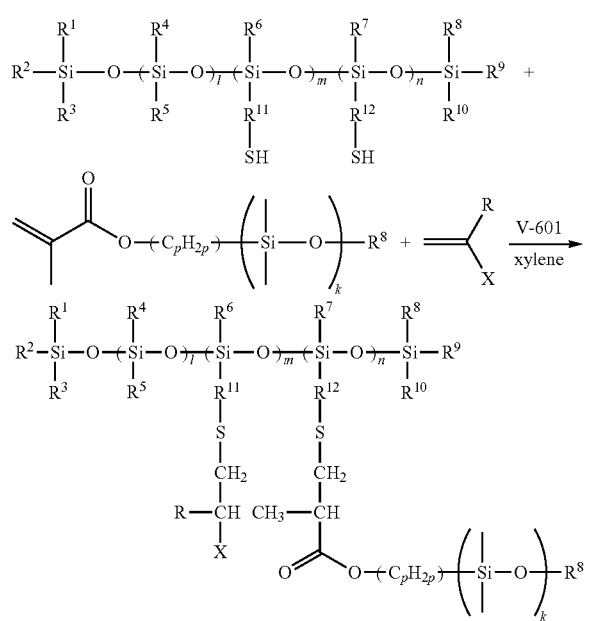

The manufacturing method of the pigment dispersant described above may refer to the description in <0110> to <0134> of JP2013-43962A, and <0110> to <0134> of JP2013-43962A are incorporated in the present invention. Here, the present invention is not limited thereto.

(Molecular Weight of Pigment Dispersant)

A weight-average molecular weight of the pigment dispersant is preferably 1,000 to 5,000,000, is more preferably 2,000 to 3,000,000, and is particularly preferably 2,500 to 3,000,000. In a case where the molecular weight is greater than or equal to 1,000, film forming properties become excellent. The weight-average molecular weight, for example, is able to be measured by a gel permeation chromatography (GPC). Specifically, the weight-average molecular weight is able to be measured in the following conditions.

Column: GPC Column TSKgelSuper HZM-H (manufactured by TOSOH CORPORATION)
Solvent: Tetrahydrofuran
Standard Substance: Monodispersed Polystyrene A number average molecular weight of the pigment dispersant is preferably 1,000 to 5,000,000, is more preferably 2,000 to 3,000,000, and is particularly preferably 2,500 to 3,000,000. In a case where the molecular weight is greater than or equal to 1,000, film forming properties become excellent. The number average molecular weight is able to be measured by the same method as that of the weight-average molecular weight.

<Pigment>

The pigment dispersion liquid of the present invention contains a pigment.

The pigment is not particularly limited, and is able to include a white pigment, a black pigment, and pigments with other colors. The white pigment or the black pigment is preferable as the pigment, and the white pigment is more preferable.

(White Pigment)

A white pigment disclosed in paragraph 0015 or paragraph 0114 of JP2005-7765A is able to be used as the white pigment.

Specifically, titanium dioxide, zinc oxide, lithopone, light calcium carbonate, white carbon, aluminum oxide, aluminum hydroxide, barium sulfate are preferable as the white pigment, and the titanium dioxide and the zinc oxide are more preferable, and in the present invention, the titanium dioxide is particularly preferable as the white pigment, and among them, rutile type titanium dioxide or anatase type titanium dioxide are more particularly preferable, and the rutile type titanium dioxide is even more particularly preferable.

The surface of the titanium dioxide is able to be subjected to a silica treatment, an alumina treatment, a titania treatment, a zirconia treatment, an organic substance treatment, and a combination thereof.

Accordingly, it is possible to suppress catalytic activity of titanium dioxide, and it is possible to improve heat resistance, matting properties, and the like.

An alumina treatment, a zirconia treatment, and a silica treatment are preferable as a surface treatment with respect to the surface of the titanium dioxide, a combined treatment of alumina/zirconia or a combined treatment of alumina/silica is particularly preferable, from the viewpoint of suppressing a b value after performing a high temperature treatment with respect to a coated film of the pigment dispersion liquid of the present invention.

(Black Pigment)

Examples of the black pigment include carbon black, titanium black, titanium carbon, iron oxide, titanium oxide, black lead, and the like, and among them, the carbon black is preferable.

(Pigments with Other Colors)

Various inorganic pigments and organic pigments known in the related art are able to be used as the pigments with other colors, and it is preferable that an organic pigment is used from the viewpoint of reliability. Examples of the organic pigment include an organic pigment disclosed in paragraph 0093 of JP2009-256572A.

In addition, C. I. Pigment Red 177, 224, 242, 254, 255, and 264, C. I. Pigment Yellow 138, 139, 150, 180, and 185, C. I. Pigment Orange 36, 38, and 71, C. I. Pigment Green 7, 36, and 58, C. I. Pigment Blue 15:6, and C. I. Pigment Violet 23 are particularly preferable from the viewpoint of color reproducibility, but the present invention is not limited thereto. Only one type of the organic pigments is able to be independently used, or various organic pigments are able to be used in combination in order to increase color purity.

In addition, the pigments with other colors described above are added to the white pigment, and thus, the color is able to be adjusted to a pastel color.

It is preferable that the pigment dispersion liquid of the present invention is a pigment dispersion liquid for forming a decorative material, and it is more preferable that the pigment dispersion liquid of the present invention is a pigment dispersion liquid for forming a white decorative material. In addition, it is also preferable that the pigment dispersion liquid of the present invention is a pigment dispersion liquid for forming a decorative material of a touch panel. It is more preferable that the pigment dispersion liquid of the present invention is a pigment dispersion liquid for forming a white decorative material used in a touch panel.

A content rate of the pigment with respect to the pigment dispersion liquid is preferably 20 to 90 mass %, is more preferably 30 to 80 mass %, and is even more preferably 40 to 75 mass %.

In addition, a mass ratio of the pigment to the pigment dispersant is preferably 0.2% to 25%, is more preferably 0.5% to 20%, and is even more preferably 1% to 15%.

In the present invention, a pigment dispersion liquid suitable for a decorative material described below or a material of a colored layer described below is provided. The pigment dispersion liquid of the present invention contains at least a pigment, the pigment dispersant described above, and any one of a hydrocarbon-based solvent, a ketone-based solvent, an ester-based solvent, and an alcohol-based solvent. An additional binder resin, a coating auxiliary agent, a curing catalyst, an antioxidant, an additional solvent, or other additives are added to the pigment dispersion liquid of the present invention, and thus, the pigment dispersion liquid is able to be used as a material of a colored layer described below.

A method of preparing the pigment dispersion liquid of the present invention is not particularly limited, but it is preferable that only a pigment, a pigment dispersant, and a solvent (and selectively, a small amount of dispersion binder) are used at the time of dispersing the pigment. In particular, it is preferable that an additive such as an additional binder described below or a condensation catalyst described below is not added as the material of the pigment dispersion liquid at the time of dispersing the pigment from the viewpoint of not hindering a dispersion step.

In a case where the pigment dispersion liquid of the present invention is used as the material of the colored layer (more specifically, a coating liquid), it is preferable that the pigment dispersion liquid of the present invention is prepared, and then, the material of the colored layer is prepared by adding the additive such as the additional binder described below or the condensation catalyst described below to the pigment dispersion liquid of the present invention. Accordingly, the preferred content rate of the pigment in the pigment dispersion liquid of the present invention may not be different from the preferred content rate of the pigment in the colored layer described below.

Hereinafter, first, a preferred aspect of the pigment dispersion liquid of the present invention in a stage of preparing the pigment dispersion liquid of the present invention will be described, and then, a preferred aspect of a case of using the pigment dispersion liquid of the present invention as the material of the colored layer (more specifically, the coating liquid) will be described.

In order to apply miscibility with respect to various additives which are added to the pigment dispersion liquid of the present invention at the time of being used as the material of the colored layer, in the pigment dispersion liquid of the present invention, it is preferable that any one of a hydrocarbon-based solvent, a ketone-based solvent, an ester-based solvent, and an alcohol-based solvent is used as a solvent thereof.

Xylene, toluene, benzene, ethyl benzene, hexane, and the like are preferable as the hydrocarbon-based solvent.

Methyl ethyl ketone, methyl isobutyl ketone, cyclohexanone, acetone, diethyl ketone, and the like are preferable as the ketone-based solvent.

Propylene glycol monomethyl ether acetate, ethyl acetate, butyl acetate, ethyl cellosolve acetate, butyl cellosolve acetate, and the like are preferable as the ester-based solvent.

Propylene glycol monomethyl ether, ethyl cellosolve, butyl cellosolve, normal propyl alcohol, butanol, and the like are preferable as the alcohol-based solvent.

Among them, the hydrocarbon-based solvent, the ester-based solvent, and the ketone-based solvent are preferable, the xylene, the methyl ethyl ketone, the methyl isobutyl ketone, the propylene glycol monomethyl ether acetate, and the ethyl acetate are particularly preferable.

A content of any one of the hydrocarbon-based solvent, the ketone-based solvent, the ester-based solvent, and the alcohol-based solvent with respect to the pigment dispersion liquid of the present invention (the total of the total solid content and the solvent) is preferably 8 to 90 mass %, is more preferably 10 to 70 mass %, and is particularly preferably 12 to 50 mass %.

A dispersing machine used at the time of dispersing the pigment is not particularly limited, and examples of the dispersing machine include a known dispersing machine such as a kneader, a roll mill, an attorider, a super mill, a dissolver, a homomixer, a sand mill, and a beads mill disclosed in Page 438 of "Pigment Dictionary", First Edition, which is written by Kunizou ASAKURA and is published by Asakura Publishing Co., Ltd., in 2000. Further, fine pulverization may be performed by using a frictional force according to mechanical grinding disclosed in Page 310 of the literature described above.

In the pigment used in the present invention, the average particle diameter of primary particles is preferably 0.16 μm to 0.3 μm, and is more preferably 0.18 μm to 0.27 μm, from the viewpoint of dispersion stability and covering power. Further, the average particle diameter of the primary particles is particularly preferably 0.19 μm to 0.25 μm. In a case where the average particle diameter of the primary particles is greater than or equal to 0.16 μm, covering power is high, and thus, a base substrate of a light shielding layer is rarely visible, and a viscosity rarely increases. On the other hand, in a case where the average particle diameter of the primary particles is less than or equal to 0.3 μm, chromaticity is sufficiently high and covering power is also high, and a surface shape at the time of performing coating is excellent.

Furthermore, here, the "average particle diameter of the primary particles" indicates a diameter at the time of setting an electron micrographic image of the particles to a circle of the same area, and a "number average particle diameter" indicates the average value of 100 particle diameters described above of a plurality of particles.

In order to disperse the pigment, the pigment dispersant described above which includes the partial structure denoted by General Formula 1 described above and the pigment adsorption portion in the same molecule is used. The amount of the pigment dispersant described above is required to be minimized from the viewpoint of thermal coloration after performing baking.

On the other hand, in a case where the pigment dispersion liquid sufficiently contains the pigment dispersant described above, stability of the dispersion liquid is improved, and precipitation and aggregation of pigment particles rarely occur.

In the precipitation and the aggregation of the pigment particles, when dispersion is performed, it is effective that a dispersion binder is added in addition to the pigment dispersant described above, and co-dispersion is performed. It is preferable that a silicone resin and a silicone oligomer are added as the dispersion binder from the viewpoint of thermal coloration. That is, the pigment dispersion liquid of the present invention may further contain a silicone resin. Such a silicone resin is not particularly limited, but a methyl silicone resin and a dimethyl silicone resin are preferable. A commercially available silicone resin may be used as the silicone resin, and for example, KR251, KR255, KR300, KR311, and X-40-9246, and the like manufactured by Shin-Etsu Chemical Co., Ltd. are able to be used.

A content of the dispersion binder with respect to the total solid content in the pigment dispersion liquid of the present invention is preferably 0.1 to 30 mass %, is more preferably 0.2 to 20 mass %, and is particularly preferably 0.5 to 10 mass %.

As described above, when the pigment dispersion liquid of the present invention is used as the material of the colored layer, as necessary, an additional binder resin, a coating auxiliary agent, a curing catalyst, an antioxidant, an additional solvent, or other additives may be added. Hereinafter, the details thereof will be described.

<Additional Binder Resin>

When the pigment dispersion liquid of the present invention is used as the material of the colored layer, it is preferable that an additional binder resin is added. The additional binder resin is not particularly limited, a silicone resin is preferable from the viewpoint of heat resistance. A known silicone resin is able to be used as the silicone resin, and a methyl-based straight silicone resin, a methyl phenyl-based straight silicone resin, an acrylic resin modified silicone resin, a polyester resin modified silicone resin, an epoxy resin modified silicone resin, an alkyd resin, a modified silicone resin, a rubber-based silicone resin, and the like are able to be used. The methyl-based straight silicone resin, the methyl phenyl-based straight silicone resin, and the acrylic resin modified silicone resin are more preferable, and the methyl-based straight silicone resin and the methyl phenyl-based straight silicone resin are particularly preferable.

Only one type of the additional binder resin may be independently used, or two or more types thereof may be used by being mixed. By mixing the additional binder resins at an arbitrary ratio, it is possible to control film physical properties. An additional binder resin identical to the dispersion binder may be used, or an additional binder resin different from the dispersion binder may be used.

An additional binder resin which is dissolved in an organic solvent or the like may be used, and for example, an additional binder resin which is dissolved in a xylene solution or a toluene solution is able to be used.

<Curing Catalyst>

In a case where the silicone resin is used in one of the pigment dispersant, the dispersion binder, and the additional binder resin or a plurality thereof, in order to form a cured film by accelerating a crosslinking reaction thereof, a condensation reaction curing catalyst (also referred to as a polymerization catalyst) may be used. It is preferable that the condensation reaction curing catalyst is a metal salt, and it is more preferable that the condensation reaction curing catalyst is a condensation catalyst containing an organic acid metal salt.

A condensation catalyst known in the related art is preferably used as a condensation catalyst (b) formed of a metal salt (excepting for an alkali metal salt and an alkali earth metal salt), and more preferably an organic acid metal salt (excepting for an alkali metal salt and an alkali earth metal salt). That is, examples of a component (b) are able to include an aluminum salt, a tin salt, and a lead salt of an organic acid or a transition metal salt, and an organic acid and the metal ion described above may form a complex salt represented by a chelate structure. A condensation catalyst containing one type or two or more types selected from aluminum, titanium, iron, cobalt, nickel, zinc, zirconium, cobalt, palladium, tin, mercury, or lead is particularly preferable as the component (b), and an organic acid zirconium salt, an organic acid tin salt, and an organic acid aluminum salt are most preferably used.

Specific examples of the condensation catalyst which is the component (b) include an organic acid tin salt such as dibutyl tin diacetate, dibutyl tin dioctate, dibutyl tin dilaurate, dibutyl tin dimalate, dioctyl tin dilaurate, dioctyl tin dimalate, and octylate tin; an organic acid titanium salt such as tetra(i-propyl) titanate, tetra(n-butyl) titanate, dibutoxy bis(acetyl acetonate) titanium, isopropyl triisostearoyl titanate, isopropyl tris(dioctyl pyrophosphate) titanate, and bis(dioctyl pyrophosphate) oxy acetate titanate; an organic acid zirconium salt such as tetrabutyl zirconate, tetrakis(acetyl acetonate) zirconium, tetraisobutyl zirconate, butoxy tris (acetyl acetonate) zirconium, zirconium naphthenate, and zirconium octylate; an organic acid aluminum salt such as tris(ethyl acetoacetate) aluminum and tris(acetyl acetonate) aluminum; and an organic acid metal salt such as zinc naphthenate, zinc formate, zinc acetyl acetonate, iron acetyl acetonate, cobalt naphthenate, and cobalt octylate. In addition, CAT-AC, D-15, D, and D-25 (all are manufactured by Shin-Etsu Chemical Co., Ltd.) may be used as a commercially available product.

The use amount of the catalyst described above may be the amount of the catalyst, 0.1 to 20 mass % of metal with respect to the pigment dispersant, the dispersion binder, and the additional binder resin is able to be used, and the use amount of the catalyst is able to be arbitrarily selected according to curing conditions.

<Other Materials>

Examples of other materials used in the colored layer are able to include materials which are able to be used in the colored layer of the transfer material described below, and the preferred ranges of the other materials are identical to the preferred ranges of the materials which are able to be used in the colored layer of the transfer material.

Components other than the materials described above which may be contained in the colored layer are not particularly limited, and a known pigment dispersion stabilizer, a known coating auxiliary agent, a known antioxidant, and the like are able to be used, but a component which does not change the tint of the colored layer or changes the tint of the colored layer to a desirable tint is desirable.

Furthermore, it is preferable that a content rate of the pigment with respect to the total solid content of the colored layer is 20 to 75 mass %. In a case where the content rate of the pigment is in this range, it is possible to form a decorative material in which heat resistance after being heated with the same degree as that at the time of performing vapor deposition with respect to a conductive layer by sputtering is in an excellent range, and other required properties are simultaneously satisfied. The content rate of the pigment with respect to the total solid content of the colored layer is more preferably 25 to 60 mass %, and is even more preferably 30 to 50 mass %.

Here, the total solid content indicates the total mass of a non-volatile component in which a solvent or the like is removed from the colored layer.

It is preferable that a content rate of a component other than the pigment with respect to the total solid content of the colored layer is greater than or equal to 30 mass %. In a case where the content rate of the component other than the pigment is in the range described above, a preferred influence is able to be applied to the tint of the colored layer of the present invention. The content rate of the component other than the pigment in the colored layer is more preferably 30 to 80 mass %, is even more preferably 35 to 70 mass %, and is particularly preferably 40 to 65 mass %.

In addition, a ratio of an additional binder resin (preferably a silicone resin) to the component other than the pigment in the colored layer is preferably greater than or equal to 80 mass %, and is more preferably greater than or equal to 90 mass %, from the viewpoint of obtaining the effect of the present invention.

<Properties of Pigment Dispersion Liquid>
(Viscosity)

A viscosity at the time of preparing the pigment dispersion liquid of the present invention by using the pigment dispersant and the pigment is preferably 10 to 500 mPa·s, is more preferably 10 to 300 mPa·s, and is particularly preferably 15 to 200 mPa·s, in an environment of 25° C.

[Decorative Material]

It is preferable that a decorative material of the present invention uses the pigment dispersion liquid of the present invention, and is formed by heating a coated film which is prepared on the basis of the pigment dispersion liquid of the present invention. In addition, the coated film prepared on the basis of the pigment dispersion liquid of the present invention is formed as a colored layer, and then, the colored layer is heated, and thus, the decorative material of the present invention may be formed.

It is preferable that the decorative material of the present invention is a decorative material for a touch panel.

It is preferable that the decorative material of the present invention is a white decorative material. Furthermore, the decorative material of the present invention may be a black decorative material. The black decorative material may be used as a light shielding layer of a touch panel described below.

It is preferable that the decorative material of the present invention is a decorative material for a touch panel and is a white decorative material.

[Substrate with Decorative Material]

A substrate with a decorative material of the present invention includes the decorative material of the present invention, and a substrate. It is preferable that the substrate with a decorative material of the present invention further includes a light shielding layer. It is preferable that the substrate with a decorative material of the present invention further includes a conductive layer. It is more preferable that the substrate with a decorative material of the present invention is a substrate with a decorative material which includes a substrate, a decorative material formed by heating a colored layer, a light shielding layer, and a conductive layer in this order.

The substrate with a decorative material of the present invention is a substrate with a decorative material which includes a substrate, a decorative material formed by heating a colored layer, a light shielding layer, and a conductive layer in this order, the substrate with a decorative material includes a light transmissive region transmitting light in a thickness direction, a decorative material configured of the decorative material formed by heating the colored layer (and the light shielding layer which may be arbitrarily included) is laminated on the substrate to surround the light transmissive region, and it is preferable that a tilt portion formed such that the thickness of the decorative material towards the inside of the light transmissive region becomes thin is included in an inner edge of the decorative material, and it is more preferable that a tilt angle between the surface of the tilt portion and the surface of the substrate is 10 to 60 degrees. The decorative material includes the tilt portion, and the tilt angle between the surface of the tilt portion and the surface of the substrate is set to be 10 to 60 degrees, and thus, a film thickness difference between the decorative material and a portion of the substrate in which the decorative material is not formed is relaxed, and a problem such as disconnection rarely occurs in the conductive layer on the decorative material (or in a case where a light shielding layer is disposed on the decorative material, the light shielding layer).

Hereinafter, a preferred aspect of a substrate with a decorative material of the present invention will be described.

<Properties of Substrate with Decorative Material>

The "decorative material" in the substrate with a decorative material of the present invention indicates a single layer or two or more layers of decorative materials (for example, a laminate of a white decorative material and a light shielding layer) of the decorative material formed by heating the colored layer. In the substrate with a decorative material of the present invention, it is preferable that a light leakage or the like is suppressed by a configuration including the decorative material formed by heating the colored layer and the light shielding layer in this order from the substrate (a film or glass) side.

In the substrate with a decorative material of the present invention, an optical density of the substrate with a decorative material is preferably 3.5 to 6.0, is more preferably 4.0 to 5.5, and is particularly preferably 4.5 to 5.0.

In a case where the substrate with a decorative material of the present invention includes a white decorative material on the substrate side as the decorative material, in the tint of the substrate with a decorative material on the substrate side, an L value is preferably 85 to 95, is more preferably 86 to 95, is particularly preferably 87 to 95, and is more particularly preferably 88 to 95, in an SCI index. Further, in the substrate with a decorative material of the present invention, it is preferable that the L value of the substrate with a decorative material on the substrate side after being subjected to a high temperature treatment at 280° C. for 30 minutes is in the range described above range in the SCI index from the viewpoint of improving the tint after performing vapor deposition with respect to the conductive layer on the light shielding layer by sputtering.

In a case where the substrate with a decorative material of the present invention includes a white decorative material on the substrate side as the decorative material, in the tint of the substrate with a decorative material on the substrate side, a b* value is preferably less than or equal to 1.0, is more preferably less than or equal to 0.5, and is particularly preferably less than or equal to −0.1, in an SCI index. Further, in the substrate with a decorative material of the present invention, it is preferable that the b* value of the substrate with a decorative material on the substrate side after being subjected to a high temperature treatment at 280° C. for 40 minutes is in the range described above in the SCI index from the viewpoint of improving the tint after performing vapor deposition with respect to the conductive layer on the light shielding layer by sputtering.

The decorative material of the present invention is a pattern in the shape of a frame around the light transmissive region (a display region) formed on a front plate of a touch panel on a non-contact side, and is formed in order to make drawing wiring or the like invisible or to perform decoration.

Figure 2:
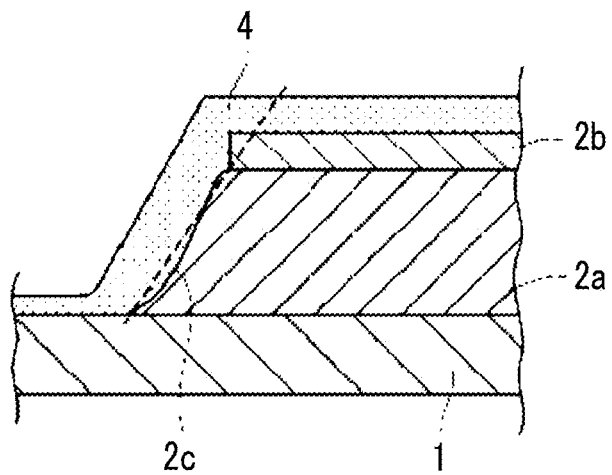
FIG. 2 is a partially enlarged sectional view illustrating another example of the decorative material.
Figure 3:
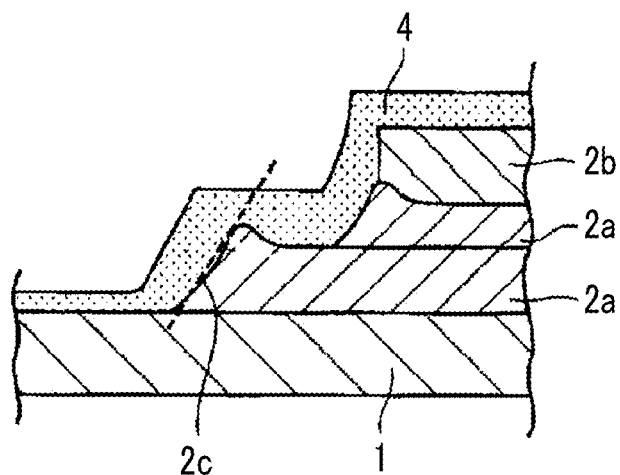
FIG. 3 is a partially enlarged sectional view illustrating still another example of the decorative material.

As illustrated in examples of FIG. 1 to FIG. 3, it is preferable that a tilt portion 2c formed such that the thickness of a decorative material becomes thin towards the inside of a light transmissive region is included in an inner edge of the decorative material which is a laminate of a decorative material 2a which is disposed on a substrate 1 and is formed by heating a colored layer, and a light shielding layer 2b. It is preferable that a conductive layer 6 is formed on the decorative material, and extends on the substrate 1 according to the tilt portion 2c of the decorative material.

By disposing the tilt portion, a film thickness difference between the decorative material and a portion of the substrate in which the decorative material is not formed is relaxed, or a problem such as disconnection rarely occurs in the conductive layer.

A formation method of the tilt portion is not particularly limited, and examples of the formation method include a method of forming a tilt portion by contracting the light shielding layer with heating, a method of forming a tilt portion by melting the colored layer with heating, and the like, and the method of forming the tilt portion by contracting the light shielding layer with heating is preferable. By contracting a light shielding portion with heating, the colored layer on the light shielding portion side is also contracted along with the light shielding layer, but the colored layer on the substrate side is not contracted along with the light shielding layer, and thus, it is possible to form a tilt portion. Forming the tilt portion by contracting the light shielding layer with heating will be described below.

The shape of the tilt portion 2c in the decorative material is not particularly limited, and examples of the shape of the tilt portion 2c include a protruding projection as illustrated in the example of FIG. 1 and FIG. 3 or a shape formed of a smooth curve as illustrated in the example of FIG. 2. In addition, as illustrated in FIG. 1 to FIG. 3, the tilt portion 2c may be formed such that the thickness of the decorative material 2a formed by heating the colored layer becomes thin towards the inside of the light transmissive region, or may be formed such that the thickness of the light shielding layer 2b also becomes thin towards the inside of the light transmissive region along with the decorative material 2a formed by heating the colored layer. As illustrated in the example of FIG. 3, the decorative material may be an aspect in which two or more layers of the decorative materials 2a formed by heating the colored layer are laminated.

Figure 4:
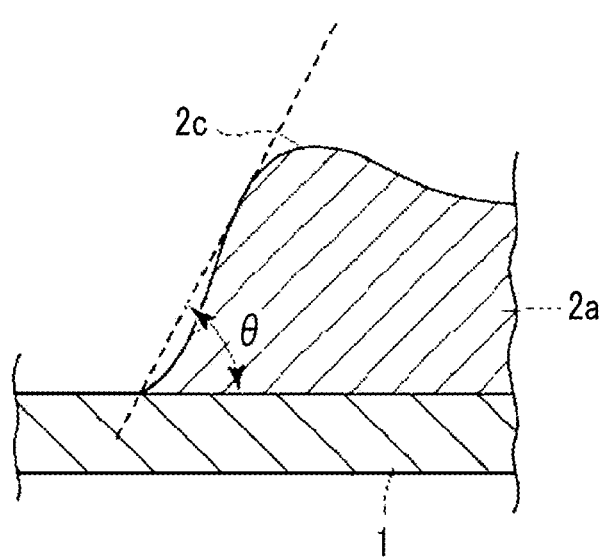
FIG. 4 is a partially enlarged sectional view illustrating a tilt angle between a tilt portion and a substrate.

A tilt angle θ between the surface of the tilt portion and the surface of the substrate in the present invention illustrated in FIG. 4 is 10 to 60 degrees, and is more preferably 15 to 55 degrees. In a case where the tilt angle θ is greater than or equal to 10 degrees, a portion in which the light shielding layer is not included on the decorative material formed by heating the colored layer decreases, abnormal appearance, that is, a region having a low optical density decreases, and a light leakage of a display device or a case where a beam of a circuit is visible decrease. On the other hand, in a case where the tilt angle θ is less than or equal to 60 degrees, a problem such as disconnection rarely occurs in the conductive layer.

As illustrated by a dotted line in FIGS. 1 to 4, the tilt angle θ is a tilt angle between a flat surface to which the surface of the tilt portion is approximated and the surface of the substrate. The tilt angle θ is able to be obtained by cutting the substrate, and by measuring an angle tilted with respect to the substrate from a sectional direction by using an optical microscope.

In a case where the tilt portion is formed by contracting the light shielding layer with heating, it is possible to form the tilt portion having a desired tilt angle by changing the type and/or the composition of resins configuring the colored layer and/or the light shielding layer.

In the present invention, it is preferable that the tilt angle θ is set such that a difference between the width of the decorative material formed by heating the colored layer on the substrate side and the width of the light shielding layer becomes less than or equal to 200 μm. According to such a configuration, it is possible to solve the problem such as abnormal appearance and disconnection of the conductive layer.

The difference between the width of the decorative material formed by heating the colored layer on the substrate side and the width of the light shielding layer (a difference in edges) is preferably less than or equal to 200 μm, is preferably 5 to 100 μm, and is more preferably 10 to 90 μm.

The width of the decorative material formed by heating the colored layer on the substrate side indicates a width of the decorative material formed by heating the colored layer on a side in contact with substrate in the decorative material formed by heating the colored layer.

<Substrate>

Various substrates are able to be used as a substrate used in the substrate with a decorative material of the present invention, it is preferable that the substrate is a film substrate, and it is more preferable that a substrate having no optical distortion or a substrate having a high transparency is used. In the substrate with a decorative material of the present invention, it is preferable that the total light transmittance of the substrate is greater than or equal to 80%.

Examples of a specific material in a case where the substrate is a film substrate are able to include polyethylene terephthalate (PET), polyethylene naphthalate, polycarbonate (PC), triacetyl cellulose (TAC), and a cycloolefin polymer (COP).

The substrate may be glass or the like.

In the substrate with a decorative material of the present invention, it is preferable that the substrate is selected from glass, TAC, PET, PC, COP, or a silicone resin (here, a silicone resin or polyorganosiloxane herein is not limited to the narrow sense denoted by a structural unit formula of $R_2SiO$, but also includes a silsesquioxane compound denoted by a structural unit formula of $RSiO_{1.5}$), and it is preferable that the substrate is formed of glass, a cycloolefin polymer, or a silicone resin.

It is preferable that the silicone resin contains basket type polyorganosiloxane as a main component, and it is more preferable that the silicone resin contains basket type silsesquioxane as a main component. Furthermore, the main component of the composition or the layer indicates that a component occupies greater than or equal to 50 mass % of the composition or the layer. Silicone resins and substrates containing the silicone resin disclosed in each publication of JP4142385B, JP4409397B, JP5078269B, JP4920513B, JP4964748B, JP5036060B, JP2010-96848A, JP2011-194647A, JP2012-183818A, JP2012-184371A, and JP2012-218322A are able to be used as the silicone resin described above or the substrate containing the silicone resin, the contents disclosed in the publications are incorporated in the present invention.

In addition, various functions may be added to the surface of the substrate. Specifically, an antireflection layer, an antiglare layer, a phase difference layer, a viewing angle enhancing layer, an antiscratch layer, a self-restoring layer, an antistatic layer, an antifouling layer, an antielectromagnetic wave layer, and a conductive layer are able to be included.

In the substrate with a decorative material of the present invention, it is preferable that the substrate includes a conductive layer on the surface of the substrate. A conductive layer disclosed in JP2009-505358A is able to be preferably used as the conductive layer.

Further, it is preferable that the substrate includes at least one of an antiscratch layer or an antiglare layer.

In the substrate with a decorative material of the present invention, a film thickness of the substrate is preferably 35 to 200 µm, is more preferably 40 to 150 µm, and is particularly preferably 40 to 100 µm.

In addition, in order to increase adhesiveness of the colored layer according to lamination in a transfer step, a non-contact surface of the substrate (the front plate) is able to be subjected to a surface treatment in advance. It is preferable that a surface treatment (a silane coupling treatment) using a silane compound is performed as the surface treatment. It is preferable that the silane coupling agent has a functional group which interacts with a photosensitive resin. For example, an aqueous solution of a silane coupling liquid (N-β(aminoethyl)γ-aminopropyl trimethoxy silane of 0.3 mass %, Product Name: KBM603, manufactured by Shin-Etsu Chemical Co., Ltd.) is sprayed by shower for 20 seconds, and pure water shower washing is performed. After that, a reaction is performed by heating. A heating tank may be used, and the reaction is able to be accelerated by preheating a substrate of a laminator.

<Colored Layer and Decorative Material>

It is preferable that the substrate with a decorative material of the present invention includes the decorative material formed by heating the colored layer between the substrate and the light shielding layer.

(Thickness of Decorative Material Formed by Heating Colored Layer)

In the substrate with a decorative material of the present invention, it is preferable that a film thickness of the decorative material formed by heating the colored layer is 10 µm to 40 µm from the viewpoint of increasing the covering power of the decorative material formed by heating the colored layer.

The thickness of the decorative material formed by heating the colored layer is more preferably 15 to 40 µm, and is particularly preferably 20 to 38 µm.

(OD of Decorative Material Formed by Heating Colored Layer)

An optical density (also referred to as OD) of the decorative material formed by heating the colored layer is preferably greater than or equal to 0.5, and is particularly preferably greater than or equal to 1.0, from the viewpoint of increasing the covering power of the decorative material formed by heating the colored layer.

<Light Shielding Layer>

In a case where the substrate with a decorative material of the present invention includes a white decorative material on the substrate side as the decorative material, it is preferable that the light shielding layer is included on the surface of the white decorative material formed by heating a white colored layer on a side opposite to the substrate. A resin for forming the light shielding layer is not particularly limited, but a thermally crosslinkable resin is preferable.

Examples of the thermally crosslinkable resin include a silicone resin having a siloxane bond in a main chain, an epoxy resin, a melamine resin, and the like, and among them, the silicone resin having a siloxane bond in a main chain is preferable. In addition, it is preferable that the light shielding layer contains a pigment.

(Silicone Resin)

It is preferable that the light shielding layer contains a silicone resin having a siloxane bond in a main chain, and among them, a methyl silicone resin is preferable. In addition, a graft type silicone polymer denoted by General Formula 1 described above may be used as the silicone resin having a siloxane bond in a main chain. Here, the substrate with a decorative material of the present invention may contain other binder resins in the light shielding layer unless otherwise contrary to the gist of the present invention.

Components other than the silicone resin or the pigment described above which are able to be used in the light shielding layer are respectively identical to the components which are able to be used in the pigment dispersion liquid of the present invention.

A ratio of the silicone resin to a component other than the pigment contained in the light shielding layer is preferably greater than or equal to 60 mass %, and is more preferably greater than or equal to 70 mass %.

Further, in the substrate with a decorative material of the present invention, it is preferable that a ratio of the silicone resin to a component other than the pigment contained in the white decorative material formed by heating the white colored layer is greater than or equal to 90 mass %, and the ratio of the silicone resin to the component other than the pigment contained in the light shielding layer is greater than or equal to 70 mass %. In this case, the more preferred range is identical to the particularly preferred range and the more particularly preferred range of the white decorative material formed by heating the white colored layer and the light shielding layer.

(Color Material for Light Shielding Layer)

A pigment is preferable as a color material for a light shielding layer, and a black pigment is more preferable. Examples of the black pigment include carbon black, titanium black, titanium carbon, iron oxide, titanium oxide, black lead, and the like, and in the substrate with a decorative material of the present invention, it is preferable that the light shielding layer contains at least one of titanium oxide or carbon black, and it is more preferable that the light shielding layer contains carbon black.

(Other Materials)

Examples of other materials which are able to be used in the light shielding layer are able to include materials which are able to be used in a colored layer of a film transfer material described below, the preferred ranges of the other materials are also identical to the preferred ranges of the materials which are able to be used in the colored layer of the transfer material for forming a decorative material.

(Thickness of Light Shielding Layer)

In the substrate with a decorative material of the present invention, it is preferable that a film thickness of the light shielding layer is 1.0 μm to 5.0 μm from the viewpoint of increasing the covering power of the light shielding layer.

The thickness of the light shielding layer is more preferably 1.0 to 4.0 μm, and is particularly preferably 1.5 to 3.0 μm.

(Optical Density of Light Shielding Layer)

It is preferable that an optical density (OD) of the light shielding layer is greater than or equal to 3.5 from the viewpoint of increasing the covering power of the light shielding layer, and it is particularly preferable that the optical density (OD) is greater than or equal to 4.0.

(Surface Electrical Resistance of Light Shielding Layer)

In the substrate with a decorative material of the present invention, surface electrical resistance of the light shielding layer is preferably greater than or equal to $1.0 \times 10^{10}$ Ω/square, is more preferably greater than or equal to $1.0 \times 10^{11}$ Ω/square, is particularly preferably greater than or equal to $1.0 \times 10^{12}$ Ω/square, and is more particularly preferably greater than or equal to $1.0 \times 10^{13}$ Ω/square. Furthermore, Ω/square is Ω of each square.

<Conductive Layer>

The substrate with a decorative material of the present invention further includes a conductive layer on the light shielding layer.

A conductive layer disclosed in JP2009-505358A is able to be preferably used as the conductive layer. In addition, the configuration or the shape of the conductive layer is described in the description of a first transparent electrode pattern, a second electrode pattern, and other conductive elements in the description of a touch panel of the present invention described below.

In the substrate with a decorative material of the present invention, it is preferable that the conductive layer contains indium (including an indium-containing compound such as ITO and an indium alloy).

In the substrate with a decorative material of the present invention, heat resistance of the decorative material formed by heating the colored layer is high, and thus, even in a case where the conductive layer is subjected to vapor deposition by sputtering, it is possible to improve film physical properties of the decorative material, and in a case where a white decorative material is included as the decorative material, it is possible to decrease the b value of the decorative material formed by heating the colored layer of the obtained substrate with a decorative material.

<Manufacturing Method of Substrate with Decorative Material>

A manufacturing method of the substrate with a decorative material of the present invention is not particularly limited, but it is preferable that the colored layer (the light shielding layer in a case where the light shielding layer is included) is able to be respectively prepared by a method selected from film transfer, thermal transfer printing, screen printing, and ink jet printing, and the film transfer is particularly preferable.

Specifically, the manufacturing method of the substrate with a decorative material include a step of laminating the colored layer and the light shielding layer on the substrate in this order is provided, and the colored layer and the light shielding layer are able to be prepared by a method selected from a method in which at least one of the colored layer or the light shielding layer is transferred onto a temporary support from a film transfer material including at least one of the colored layer or the light shielding layer, and then, the temporary support is removed, thermal transfer printing in which a thermal transfer material including at least one of the colored layer or the light shielding layer on the temporary support side is heated, and thus, at least one of the colored layer or the light shielding layer is transferred from the temporary support, screen printing of a composition for forming a colored layer or a composition for forming a light shielding layer, and ink jet printing of a composition for forming a colored layer or a composition for forming a light shielding layer. In addition, it is preferable that a step is included in which the decorative material is in the shape of a frame to surround the light transmissive region on the substrate, and the tilt portion is formed in the inner edge of the decorative material such that the thickness of the decorative material towards the inside of the light transmissive region becomes thin.

The colored layer and the light shielding layer may be formed by combining a plurality of film transfer, thermal transfer printing, screen printing, and ink jet printing.

Further, in the manufacturing method of the substrate with a decorative material, it is preferable that the colored layer and the light shielding layer are formed by transferring the light shielding layer and the colored layer onto the substrate from the film transfer material including at least the temporary support, the light shielding layer, and the colored layer in this order, and then, by removing the temporary support, or are formed by transferring the colored layer onto the substrate from the film transfer material including the temporary support and the colored layer, and then, by removing the temporary support, and by transferring the light shielding layer onto the colored layer from the film transfer material including at least the temporary support and the light shielding layer, and then, by removing the temporary support.

[Transfer Material for Forming Decorative Material]

<Film Transfer: Film Transfer Material>

The transfer material for forming a decorative material of the present invention includes a colored layer using the pigment dispersion liquid of the present invention. It is preferable that the transfer material for forming a decorative material of the present invention is a film transfer material.

Figure 5:
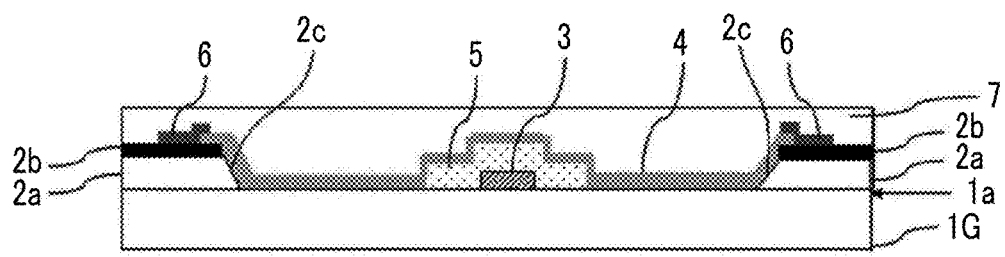
FIG. 5 is a sectional schematic view illustrating a configuration of one example of a touch panel of the present invention using a substrate with a decorative material of the present invention.
Figure 7:
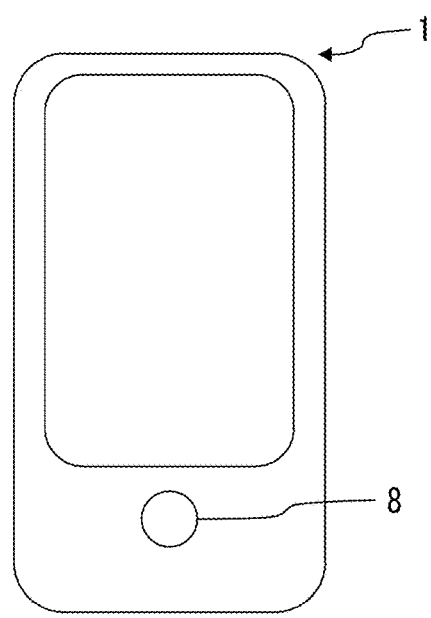
FIG. 7 is an explanatory diagram illustrating one example of a front plate of the touch panel of the present invention.

In a capacitance type input device including an opening portion 8 having a configuration of FIG. 7, in a case where the colored layer (the decorative material 2a before being heated), the light shielding layer 2b, and the like, illustrated in FIG. 5, are formed by using a film transfer material, a resist component is not leaked from the opening portion even in the substrate having the opening portion (the front plate), and in particular, the resist component is not leaked from a glass end in the decorative material 2a formed by heating the colored layer or the light shielding layer 2b in which it is necessary to form a light shielding pattern up to the boundary of the front plate, and thus, a substrate back side is not able to be contaminated, and a touch panel having a merit of a reduction in a thickness and a weight is able to be manufactured in a simple step.

It is preferable that the film transfer material includes the temporary support, the light shielding layer, and the colored layer. Furthermore, it is preferable that the light shielding layer and the colored layer in the film transfer material have the same composition as that of the light shielding layer and the colored layer in the substrate with a decorative material of the present invention, and the light shielding layer and the colored layer in the film transfer material may have a different composition according to a manufacturing step after being transferred onto the substrate. For example, in a case where the light shielding layer and the colored layer in the film transfer material contain a polymerizable compound, in the light shielding layer and the decorative material formed by heating the colored layer of the substrate with a decorative material of the present invention, a content ratio of the polymerizable compound may be changed.

In addition, the colored layer included in the film transfer material contains at least a color material and a binder resin.

Hereinafter, in the film transfer material used in the substrate with a decorative material of the present invention, a preparation method of the transfer material and each element configuring the film transfer material will be described in detail.

(Light Shielding Layer and Colored Layer (Colored Layer))

The film transfer material includes at least one of the light shielding layer or the colored layer (hereinafter, also collectively referred to as a colored layer).

The light shielding layer and the colored layer included in the transfer material are transferred onto the substrate described below, and thus, the light shielding layer and the decorative material formed by heating the colored layer of the substrate with a decorative material of the present invention are able to be formed.

(1) Material of Colored Layer

The colored layer contains a color material, and a binder resin material for forming the color material as a colored layer. In addition, it is preferable that the colored layer further contains a polymerizable compound and a polymerization initiator according to the use environment and the application. In addition, the colored layer is able to contain an antioxidant and a polymerization inhibitor.

(1-1) Color Material

Each of the pigments of the light shielding layer and the decorative material formed by heating the colored layer of the substrate with a decorative material of the present invention is able to be used as the color material of the film transfer material.

(1-2) Binder Resin

The binder resin of the film transfer material is not particularly limited except for containing at least one type of silicone resin which is used in the light shielding layer and the decorative material formed by heating the colored layer of the substrate with a decorative material of the present invention, and a binder resin which is able to be transferred onto the substrate after the colored layer is formed on the temporary support is able to be used.

(1-3) Antioxidant

An antioxidant may be added to the colored layer. In particular, in a case where the colored layer is a colored layer, it is preferable that the antioxidant is added. A hindered phenol-based antioxidant, a semihindered phenol-based antioxidant, a phosphate-based antioxidant, and a hybrid type antioxidant having phosphate/hindered phenol in the molecules are able to be used as the antioxidant.

It is preferable that the antioxidant used in the present invention is a phosphate-based antioxidant, for example, IRGAFOS168 (manufactured by BASF SE), from the viewpoint of suppressing coloration.

(1-4) Solvent

In addition, a solvent disclosed in paragraphs 0043 to 0044 of JP2011-95716A is able to be used as a solvent at the time of manufacturing a colored layer of a transfer film by coating. Specifically, cyclohexanone, methyl ethyl ketone, and the like are preferable.

(1-5) Additive

Further, other additives may be used in the colored layer. Examples of the additive include surfactants disclosed in paragraph 0017 of JP4502784B and paragraphs 0060 to 0071 of JP2009-237362A, a thermal polymerization inhibitor disclosed in paragraph 0018 of JP4502784B, and other additives disclosed in paragraphs 0058 to 0071 of JP2000-310706A.

In addition, MEGAFAC F-780F (manufactured by DIC Corporation) and the like may be added as a coating auxiliary agent.

(Temporary Support)

The transfer material includes a temporary support.

A temporary support which has flexibility and is not considerably deformed, contracted, or stretched even under pressure, or under pressure and heating is preferable as the temporary support. Examples of such a temporary support are able to include a polyethylene terephthalate film, a cellulose triacetate film, a polystyrene film, a polycarbonate film, and the like, and among them, a biaxially stretched polyethylene terephthalate film is particularly preferable.

The thickness of the temporary support is not particularly limited, but is preferably 5 to 300 µm, and is more preferably 20 to 200 µm.

In addition, the temporary support may be transparent, and may contain dyed silicon, alumina sol, a chromium salt, a zirconium salt, and the like.

In addition, conductivity is able to be applied to the temporary support by a method or the like disclosed in JP2005-221726A.

(Thermoplastic Resin Layer)

The transfer material may include at least one thermoplastic resin layer. It is preferable that the thermoplastic resin layer is disposed between the temporary support and the colored layer. That is, it is preferable that the transfer material includes the temporary support, the thermoplastic resin layer, and the colored layer in this order.

An organic polymer substance disclosed in JP1993-72724A (JP-H05-72724A) is preferable as a component used in the thermoplastic resin layer, and it is particularly preferable that an organic polymer substance of which a softening point according to a Vicat method (specifically, a polymer softening point measurement method using an American material test method ASTMD 1235) is approximately lower than or equal to 80° C. is selected.

Specifically, examples of the organic polymer include an organic polymer such as polyolefin such as polyethylene and polypropylene, an ethylene copolymer such as ethylene and vinyl acetate, or a saponified product thereof, a vinyl chloride copolymer such as ethylene and acrylic acid ester, or a saponified product thereof, polyvinyl chloride, vinyl chloride, vinyl acetate, and a saponified product thereof, a styrene copolymer such as polyvinylidene chloride, vinylidene chloride copolymer, polystyrene, styrene, and (meth)acrylic acid ester, or a saponified product thereof, a vinyl toluene copolymer such as polyvinyl toluene, vinyl toluene, and (meth)acrylic acid ester, or a saponified product thereof, a (meth)acrylic acid ester copolymer such as poly (meth)acrylic acid ester, butyl (meth)acrylic acid, and vinyl acetate, and a polyamide resin such as vinyl acetate copolymer nylon, copolymerization nylon, N-alkoxy methylated nylon, and N-dimethyl aminated nylon.

The thickness of the thermoplastic resin layer is preferably 6 to 100 μm, and is more preferably 6 to 50 μm. By setting the thickness of the thermoplastic resin layer to be in a range of 6 to 100 μm, even in a case where concavities and convexities exist on the substrate, it is possible to completely absorb the concavities and convexities.

(Intermediate Layer)

The transfer material may includes at least one intermediate layer in order to prevent the components from being mixed at the time of coating a plurality of coated layers and of being preserved after the coating. It is preferable that the intermediate layer is disposed between the temporary support and the colored layer (in a case where the thermoplastic resin layer is included, between the thermoplastic resin layer and the colored layer). That is, it is preferable that the transfer material includes the temporary support, the thermoplastic resin layer, the intermediate layer, and the colored layer in this order.

It is preferable that an oxygen blocking film having an oxygen blocking function which is disclosed in JP1993-72724A (JP-H05-72724A) as a "separating layer" is used as the intermediate layer, and in this case, sensitivity at the time of performing exposure increases, a time load of an exposure machine is reduced, and productivity is improved.

A film which has low oxygen permeability and is dispersed or dissolved in water or an alkali aqueous solution is preferable as the oxygen blocking film, and the oxygen blocking film is able to be suitably selected from known oxygen blocking films. Among them, a combination between polyvinyl alcohol and polyvinyl pyrrolidone is particularly preferable.

The thickness of the intermediate layer is preferably 0.1 to 5.0 μm, and is more preferably 0.5 to 2.0 μm. In a range of 0.1 to 5.0 μm, the oxygen blocking function does not decrease, and a time required for development or removal of the intermediate layer does not excessively increase.

(Protective Peeling Layer)

It is preferable that a protective peeling layer (also referred to as a cover film) is disposed in the transfer material to cover the colored layer in order to protect the colored layer from contamination or damage at the time of being stored. The protective peeling layer may be formed of the material as that of the temporary support or a different material from that of the temporary support, and should be easily separated from the colored layer. For example, silicone paper and a polyolefin or polytetrafluoroethylene sheet are suitable as the material of the protective peeling layer.

The maximum value of the degree of haze of the protective peeling layer is preferably less than or equal to 3.0%, and is preferably less than or equal to 2.5%, is more preferably less than or equal to 2.0%, and is particularly preferably less than or equal to 1.0% from the viewpoint of more effectively suppress the occurrence of voids after the colored layer is developed.

The thickness of the protective peeling layer is preferably 1 to 100 μm, is more preferably 5 to 50 μm, and is particularly preferably 10 to 30 μm. In a case where the thickness is greater than or equal to 1 μm, the strength of the protective peeling layer is sufficient, and thus, when the cover film is bonded to the photosensitive resin layer, the protective peeling layer is rarely ruptured. In a case where the thickness is less than or equal to 100 μm, the price of the protective peeling layer does not increase, and wrinkles rarely occur at the time of laminating the protective peeling layer.

Examples of such a protective peeling layer include a polyethylene terephthalate film such as ALPHAN MA-410, E-200C, and E-501 manufactured by Oji Paper Co., Ltd., a polypropylene film manufactured by Shin-Etsu Film Co., Ltd. or the like, PS series such as PS-25 manufactured by TEIJIN LIMITED, and the like as a commercially available protective peeling layer, but are not limited thereto. In addition, a commercially available film is subjected to sand blast processing, and thus, the commercially available film is able to be simply manufactured.

A polyolefin film such as a polyethylene film is able to be used as the protective peeling layer. In addition, in general, the polyolefin film used as the protective peeling layer is manufactured by thermally fusing, kneading, extruding, biaxially stretching, and casting a raw material or an inflation method.

As described above, the film transfer material which is able to be used in the present invention has been described, but the film transfer material may be a negative type material or a positive type material, as necessary.

<Manufacturing Method of Film Transfer Material>

A manufacturing method of the film transfer material described above is not particularly limited, and for example, the film transfer material is able to be manufactured by steps disclosed in paragraphs 0064 to 0066 of JP2005-3861A. In addition, the film transfer material, for example, is able to be prepared by a method disclosed in JP2009-116078A.

One example of the manufacturing method of the film transfer material includes a method including a step of forming the colored layer by applying a resin composition onto the temporary support and by drying the resin composition, and a step of covering the formed colored layer with the protective peeling layer.

Here, the film transfer material which is able to be used in the present invention may form at least two layers of the colored layer and the light shielding layer as the colored layer, and in a case where the film transfer material including the temporary support and the colored layer is transferred onto the substrate, and then, the temporary support is removed, and the film transfer material including at least the temporary support and the light shielding layer is transferred onto the colored layer, the film transfer material may form at least one layer of the colored layer or the light shielding layer as the colored layer. In the former case, in (the transfer material of) the present invention, the colored layer and the light shielding layer may be laminated on the temporary support in this order, and this case is preferable in process since it is possible to dispose the decorative material and the light shielding material on the (glass) substrate at once.

In the film transfer material which is able to be used in the present invention, unless otherwise contrary to the gist of the present invention, other layers may be formed. In addition, before the colored layer is formed, the thermoplastic resin layer and/or the intermediate layer (an oxygen blocking layer) may be formed by coating.

A known coating method is able to be used as a method of applying a composition for forming a colored layer, a coating liquid for forming a thermoplastic resin layer, and a coating liquid for forming an intermediate layer onto the temporary support. For example, the coating liquids are applied by using a coater such as a spinner, a whirler, a roller coater, a curtain coater, a knife coater, a wire bar coater, and an extruder, and are dried, and thus, the layers are able to be formed.

—Solvent—

A coloration photosensitive composition for forming the transfer material of the film transfer material is able to be preferably prepared by using a solvent along with each component contained in the coloration photosensitive composition.

Examples of the solvent include esters, for example, ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxy acetate, ethyl oxy acetate, butyl oxy acetate, methyl methoxy acetate, ethyl methoxy acetate, butyl methoxy acetate, methyl ethoxy acetate, ethyl ethoxy acetate, 3-oxy propionic acid alkyl esters (for example, methyl 3-methoxy propionate, ethyl 3-methoxy propionate, methyl 3-ethoxy propionate, and ethyl 3-ethoxy propionate) such as methyl 3-oxy propionate and ethyl 3-oxy propionate, 2-oxy propionic acid alkyl esters (for example, methyl 2-methoxy propionate, ethyl 2-methoxy propionate, propyl 2-methoxy propionate, methyl 2-ethoxy propionate, ethyl 2-ethoxy propionate, methyl 2-oxy-2-methyl propionate, ethyl 2-oxy-2-methyl propionate, methyl 2-methoxy-2-methyl propionate, and ethyl 2-ethoxy-2-methyl propionate) such as methyl 2-oxy propionate, ethyl 2-oxy propionate, and propyl 2-oxy propionate, methyl pyruvate, ethyl pyruvate, propyl pyruvate, methyl acetoacetate, ethyl acetoacetate, methyl 2-oxobutanoate, ethyl 2-oxobutanoate, and the like;

ethers, for example, diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether acetate, propylene glycol monoethyl ether acetate, propylene glycol propyl ether acetate, and the like;

ketones, for example, methyl ethyl ketone, methyl isobutyl ketone, cyclohexanone, 2-heptanone, 3-heptanone, and the like;

aromatic hydrocarbons, for example, toluene and xylene; and the like.

Among them, the methyl ethyl ketone, the methyl isobutyl ketone, the xylene, the cyclohexanone, the propylene glycol monomethyl ether, the propylene glycol monomethyl ether acetate, and the like are preferable.

Only one type of the solvent may be independently used, or two or more types thereof may be used in combination.

A method of covering the colored layer with the protective peeling layer is not particularly limited, and a method is able to be used in which the protective peeling layer is superimposed on the colored layer which is disposed on the temporary support, and is subjected to pressure bonding.

A known laminator such as a laminator, a vacuum laminator, and an automatic cutting laminator for further increasing productivity is able to be used in the pressure bonding.

An atmospheric temperature of 20° C. to 45° C. and a line pressure of 1,000 to 10,000 N/m are preferable as the conditions of the pressure bonding.

—Lamination Method—

Transferring (bonding) the colored layer to the surface of the substrate is performed by superimposing the colored layer on the surface of the substrate, and by pressing and heating the colored layer and the substrate. A known laminator such as a laminator, a vacuum laminator, and an automatic cutting laminator for further increasing productivity is able to be used in the bonding.

A method in which a punched decorative material is transferred to the substrate, and thus, accuracy is excellent in sheet type lamination, and air bubbles do not enter between the substrate and the decorative material is preferable as the lamination method from the viewpoint of increasing a yield ratio.

Specifically, a vacuum laminator is able to be preferably used.

Examples of a device used in the lamination (continuous type lamination/sheet type lamination) V-SE340aaH manufactured by CLIMB PRODUCTS CO., LTD., and the like.

Examples of the vacuum laminator device are able to include a vacuum laminator device manufactured by Takanoseiki Corporation, FVJ-540R and FV700 manufactured by Taisei Laminator Co., LTD., and the like.

By including a step of further laminating a support on the temporary support on a side opposite to a coloring agent before the film transfer material is bonded to the substrate, a preferred effect is able to be obtained in which air bubbles do not enter at the time of performing the lamination. At this time, a support to be used is not particularly limited, and examples of the support are able to include the followings.

Polyethylene terephthalate, polycarbonate, triacetyl cellulose, and a cycloolefin polymer.

In addition, a film thickness is able to be selected from a range of 50 to 200 μm.

—Step of Removing Temporary Support—

It is preferable that the manufacturing method of the film transfer material includes a step of removing the temporary support from the transfer material which is bonded to the substrate.

—Step of Removing Thermoplastic Resin Layer and Step of Removing Intermediate Layer—

Further, in a case where the film transfer material includes the thermoplastic resin layer or the intermediate layer, it is preferable that a step of removing the thermoplastic resin layer and the intermediate layer is provided.

The step of removing the thermoplastic resin layer and the intermediate layer, in general, is able to be performed by an alkali developer which is used in a photolithography system. The alkali developer is not particularly limited, and a known developer such as a developer disclosed in JP1993-72724A (JP-H05-72724A) is able to be used. Furthermore, a developer which allows the decorative material to have a soluble type development behavior is preferable as the developer, and for example, a developer containing a compound having pKa of 7 to 13 at a concentration of 0.05 to 5 mol/L is preferable, and a small amount of an organic solvent having miscibility with respect to water may be added. Examples of the organic solvent having miscibility with respect to water are able to include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethyl formamide, dimethyl acetoamide, hexamethyl phosphoramide, ethyl lactate, methyl lactate, ε-caprolactam, N-methyl pyrrolidone, and the like. It is preferable that the concentration of the organic solvent is 0.1 mass % to 30 mass %.

In addition, a known surfactant is able to be further added to the alkali developer. It is preferable that the concentration of the surfactant is 0.01 mass % to 10 mass %.

A method of performing the step of removing the thermoplastic resin layer and the intermediate layer may be any one of a paddle, a shower, a shower & a spin, a dip, and the like. Here, in the description of the shower, the thermoplastic resin layer or the intermediate layer is able to be removed by spraying the developer using a shower. In addition, it is preferable that a washing agent or the like is sprayed by a shower after performing the development, and the residue is removed while being wiped with a brush or the like. It is preferable that a liquid temperature is 20° C. to 40° C., and it is preferable that pH is 8 to 13.

—Postbaking Step—

It is preferable that a postbaking step is provided after the transfer step, and it is more preferable that a step of performing postbaking is provided after the step of removing the thermoplastic resin layer and the intermediate layer.

In the manufacturing method of the film transfer material, it is preferable that the colored layer and the light shielding layer of the film transfer material are formed by being heated at 50° C. to 300° C. under an environment of 0.08 to 1.2 atm from the viewpoint of making a whiteness and productivity compatible.

In addition, it is preferable that a tilt portion formed such that the thickness of the decorative material becomes thin towards the inside of the light transmissive region is formed in the inner edge of the decorative material of the present invention, and it is preferable that the tilt portion is formed by contracting the light shielding layer with heating. For example, in the postbaking step, the decorative material is heated at 50° C. to 300° C., and thus, the light shielding layer is contracted, and accordingly, the tilt portion is able to be formed.

It is more preferable that the heating in the postbaking is performed under an environment of greater than or equal to 0.5 atm. On the other hand, it is more preferable that the heating is performed under an environment of less than or equal to 1.1 atm, and it is particularly preferable that the heating is performed under an environment of less than or equal to 1.0 atm. Further, it is more particularly preferable that the heating is performed under an environment of approximately 1 atm (an atmospheric pressure) from the viewpoint of enabling manufacturing costs to be reduced without using a special decompression device. Here, in the related art, in a case where the colored layer and the light shielding layer are formed by being cured with heating, the heating is performed under a decompression environment in which the pressure is extremely low, and an oxygen concentration decreases, and thus, a whiteness after baking is maintained, but by using the film transfer material, it is possible to improve the tint of the decorative material formed by heating the colored layer and the light shielding layer of the substrate with a decorative material of the present invention on the substrate side (to decrease the b value) even after the baking is performed in the pressure range described above, and to increase a whiteness.

A postbaking temperature is preferably 50° C. to 300° C., is more preferably 100° C. to 300° C., and is even more preferably 120° C. to 300° C.

In addition, the postbaking may be performed at each of two or more different temperatures only for a predetermined time. For example, first, the heating is able to be performed at 50° C. to 200° C., preferably at 100° C. to 200° C., and then, the heating is able to be performed at 200° C. to 280° C., preferably at 220° C. to 260° C.

A postbaking time is more preferably 20 to 150 minutes, and is particularly preferably 30 to 100 minutes. In a case where the postbaking is performed on two or more temperature stages, it is preferable that the postbaking is performed such that the total temperature in each stage becomes 20 to 150 minutes.

The postbaking may be performed under an air environment, or may be performed under a nitrogen substituted environment, but it is particularly preferable that the postbaking is performed under the air environment from the viewpoint of enabling manufacturing costs to be reduced without using a special decompression device.

—Other Steps—

The manufacturing method of the film transfer material may include other steps such as a postexposure step.

In a case where the colored layer contains a photocurable resin, it is preferable that the postexposure step is provided at the time of forming the colored layer and the light shielding layer. The postexposure step may be performed only from a surface direction on a side where the colored layer and the light shielding layer are in contact with the substrate, may be performed only from a surface direction on a side where the colored layer and the light shielding layer are not in contact with the transparent substrate, or may be performed from both surface directions.

Furthermore, a method disclosed in paragraphs 0035 to 0051 of JP2006-23696A is also able to be used in the present invention as an example of the exposure step, the development step, the step of removing the thermoplastic resin layer and the intermediate layer, and the other steps.

<Thermal Transfer Printing>

In thermal transfer printing, it is preferable that the colored layer and the light shielding layer are respectively prepared thermal transfer printing in which the temporary support side of the thermal transfer material including at least one of the colored layer or the light shielding layer on the temporary support is heated, and at least one of the colored layer or the light shielding layer is transferred from the temporary support, and the colored layer included in the thermal transfer material contains the graft type silicone polymer denoted by General Formula 1. Ink ribbon printing is preferable as a method of performing the thermal transfer printing. Examples of the method of performing the ink ribbon printing which is used in the manufacturing method substrate with a decorative material of the present invention are able to include a method disclosed in "Non-Impact Printing—Technology and Material—(published by CMC Publishing CO., LTD. on Dec. 1, 1986)", and the like.

<Screen Printing>

In screen printing, it is preferable that the colored layer and the light shielding layer are prepared by performing screen printing with respect to the composition for forming a colored layer or the composition for forming a light shielding layer, and the composition for forming a colored layer and the composition for forming a light shielding layer contain the graft type silicone polymer denoted by General Formula 1. A method of performing the screen printing is not particularly limited, and a known method is able to be used, and for example, a method disclosed in JP4021925B, and the like are able to be used. In addition, by performing the screen printing a plurality of times, it is possible to make a film thickness thick even in the screen printing.

<Ink Jet Printing>

In ink jet printing, it is preferable that the colored layer and the light shielding layer are prepared by performing ink jet printing with respect to the composition for forming a colored layer or the composition for forming a light shielding layer, and the composition for forming a colored layer and the composition for forming a light shielding layer contain the graft type silicone polymer denoted by General Formula 1. Examples of a method of performing the ink jet printing which is used in the manufacturing method of the substrate with a decorative material of the present invention are able to include a method disclosed in "Electronics Application of Ink Jet Technology (published by REALIZE Science & Engineering on Sep. 29, 2006)" and the like.

[Touch Panel]

A touch panel of the present invention includes the decorative material of the present invention, the decorative material using the transfer material for forming a decorative material of the present invention, or the substrate with a decorative material of the present invention.

It is preferable that such a touch panel is a capacitance type input device.

<Capacitance Type Input Device and Image Display Device Including Capacitance Type Input Device as Constituent>

It is preferable that the capacitance type input device includes a front plate (also referred to as a substrate), and at least the following elements of (1) to (4) on a non-contact side of the front plate, and includes the substrate with a decorative material of the present invention as a laminate including the front plate (the substrate) and (1) a decorative material which includes the decorative material formed by heating the colored layer.

(1) A decorative material which includes the decorative material formed by heating the colored layer (2) A plurality of first transparent electrode patterns which are formed by allowing a plurality of pad portions to extend in a first direction through a connection portion (3) A plurality of second electrode patterns which are electrically insulated from the first transparent electrode pattern and are formed of a plurality of pad portions formed by extending in a direction intersecting with the first direction (4) An insulating layer which electrically insulates the first transparent electrode pattern from the second electrode pattern In addition, in the capacitance type input device, the second electrode pattern may be a transparent electrode pattern.

Further, the capacitance type input device may further include the following element (5).

(5) A conductive element which is electrically connected to at least one of the first transparent electrode pattern or the second transparent electrode pattern and is different from the first transparent electrode pattern and the second transparent electrode pattern Further, it is more preferable that the capacitance type input device includes the substrate with a decorative material of the present invention as a laminate including the front plate (the substrate), (1) the decorative material including the decorative material formed by heating the colored layer, and at least one electrode pattern of (2), (3), or (5) described above as the conductive layer.

It is preferable that (1) the decorative material including the decorative material formed by heating the colored layer further includes the light shielding layer.

<Configuration of Capacitance Type Input Device>

Figure 6:
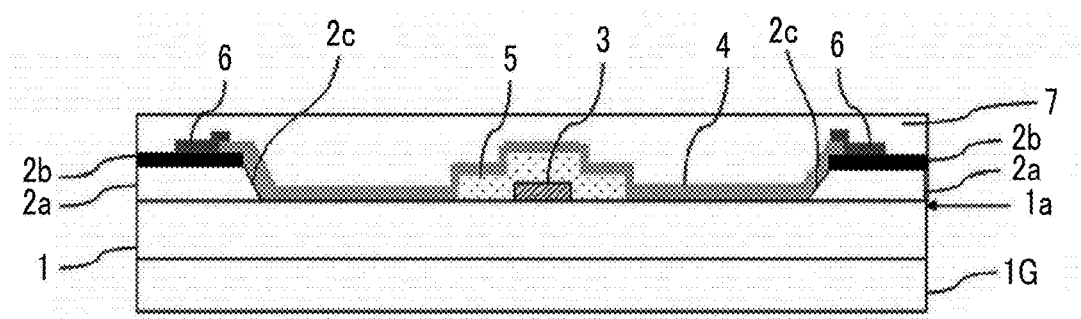
FIG. 6 is a sectional schematic view illustrating a configuration of another example of the touch panel of the present invention using the substrate with a decorative material of the present invention.

First, the configuration of the capacitance type input device formed according to the manufacturing method of the present invention will be described. FIG. 5 and FIG. 6 are sectional views illustrating a preferred configuration of the capacitance type input device of the present invention. In FIG. 5, a capacitance type input device 10 is configured of a front plate 1G (a cover glass), the decorative material 2a formed by heating the colored layer, the light shielding layer 2b, a first transparent electrode pattern 3, a second transparent electrode pattern 4, an insulating layer 5, a conductive element 6, and a transparent protective layer 7. The decorative material 2a formed by heating the colored layer includes the tilt portion 2c, and thus, the decorative material 2a formed by heating the colored layer is formed such that the thickness towards the inside of the capacitance type input device 10 becomes thin.

It is preferable that the front plates 1 and/or 1G are configured of a light transmissive substrate. Any one of a light transmissive substrate in which a decorative material described below is disposed on the cover glass 1G or a light transmissive substrate in which a decorative material described below is disposed on a film substrate in the order of the cover glass 1G and the film substrate 1 is able to be used light transmissive substrate. It is preferable that the decorative material is disposed on the cover glass from the viewpoint of thinning the touch panel, and it is preferable that the decorative material is disposed on the film substrate, and the decorative material and the film substrate are bonded onto the cover glass from the viewpoint of productivity of the touch panel.

In addition, the cover glass 1G is able to be disposed on the film substrate on a side opposite to an electrode. Strengthened glass represented by gorilla glass manufactured by Corning Incorporated, and the like are able to be used as the glass substrate. In addition, in FIG. 5 and FIG. 6, a side of the front plates 1 and/or 1G on which each element is disposed will be referred to as a non-contact surface 1a. In the capacitance type input device 10 of the present invention, input is performed by bringing a finger or the like into contact with a contact surface (1a: a surface opposite to the non-contact surface) of the front plates 1 and/or 1G. Hereinafter, there is a case where the front plate will be referred to as a "substrate".

In addition, the decorative material 2a formed by heating the colored layer and the light shielding layer 2b are disposed on the non-contact surface of the front plates 1 and/or 1G. The decorative material 2a formed by heating the colored layer and the light shielding layer 2b are decorative materials and patterns in the shape of a frame surrounding the light transmissive region (the display region) formed on the front plate of the touch panel on the non-contact side, and are formed in order to make drawing wiring or the like invisible or to perform decoration.

The capacitance type input device 10 of the present invention is able to include a wiring lead-out port (not illustrated). In a case where the substrate with a decorative material of the capacitance type input device including the wiring lead-out portion is formed, leakage of a resist component from the wiring lead-out portion or protrusion of the resist component from the glass end in the decorative material occur in a case where the decorative material 2 is formed by using a liquid resist for forming a decorative material or screen printing ink, and a substrate back side is contaminated, but in a case where the substrate with a decorative material including the wiring lead-out portion is used, the problems described above are able to be also solved.

A plurality of first transparent electrode patterns 3 which are formed by allowing a plurality of pad portions to extend in a first direction through a connection portion, a plurality of second transparent electrode patterns 4 which are electrically insulated from the first transparent electrode pattern 3 and are formed of a plurality of pad portions formed by extending in a direction intersecting with the first direction, and the insulating layer 5 which electrically insulates the first transparent electrode pattern 3 from the second transparent electrode pattern 4 are formed on the non-contact surface of the front plates 1 and/or 1G. The first transparent electrode pattern 3, the second transparent electrode pattern 4, and the conductive element 6 described below, for example, are able to be prepared by a conductive metal oxide film having light transmissivity such as indium tin oxide (ITO), indium zinc oxide (IZO), and the like. Examples of such a metal film include an ITO film; a metal film of Al, Zn, Cu, Fe, Ni, Cr, Mo, and the like; a metal oxide film of $SiO_2$ and the like, and the like. At this time, a film thickness of each element is able to be set to 10 to 200 nm. In addition, an amorphous ITO film is set to be a polycrystalline ITO film by calcining, and thus, electrical resistance is able to be reduced. In addition, the first transparent electrode pattern 3, the second transparent electrode pattern 4, and the conductive element 6 described below are able to be manufactured by using a transfer film including the decorative material using the conductive fiber described above. In addition, in a case where the first conductive pattern or the like is formed by ITO and the like, it is possible to refer to paragraphs 0014 to 0016 of JP4506785B and the like.

In addition, at least one of the first transparent electrode pattern 3 or the second transparent electrode pattern 4 is able to be disposed over both regions of the non-contact surface of the front plates 1 and/or 1G and the surface of the light shielding layer 2b on a side opposite to the front plates 1 and/or 1G. In FIG. 5 and FIG. 6, it is illustrated that the second transparent electrode pattern 4 is disposed over both regions of the non-contact surface of the front plates 1 and/or 1G and the surface of the light shielding layer 2b on a side opposite to the front plates 1 and/or 1G, and a side surface of the decorative material 2a formed by heating the colored layer is covered with the second transparent electrode pattern 4. Here, the width of the decorative material 2a formed by heating the colored layer is able to be narrower than the width of the light shielding layer 2b, and in this case, at least one of the first transparent electrode pattern 3 or the second transparent electrode pattern 4 is able to be disposed over a region of the surface of the non-contact surface of the front plates 1 and/or 1G and the surface of the decorative material 2a formed by heating the colored layer and the light shielding layer 2b on a side opposite to the front plates 1 and/or 1G. Thus, even in a case where the transfer film is laminated over the decorative material including the decorative material 2a formed by heating the colored layer which is required to have a constant thickness and the light shielding layer 2b and the back surface of the front plate, the film transfer material (in particular, the film transfer material including the thermoplastic resin layer) is used, and thus, it is possible to perform lamination in which bubbles are not generated on a partial boundary of the decorative material 2 by a simple step without using expensive equipments such as a vacuum laminator.

Figure 8:
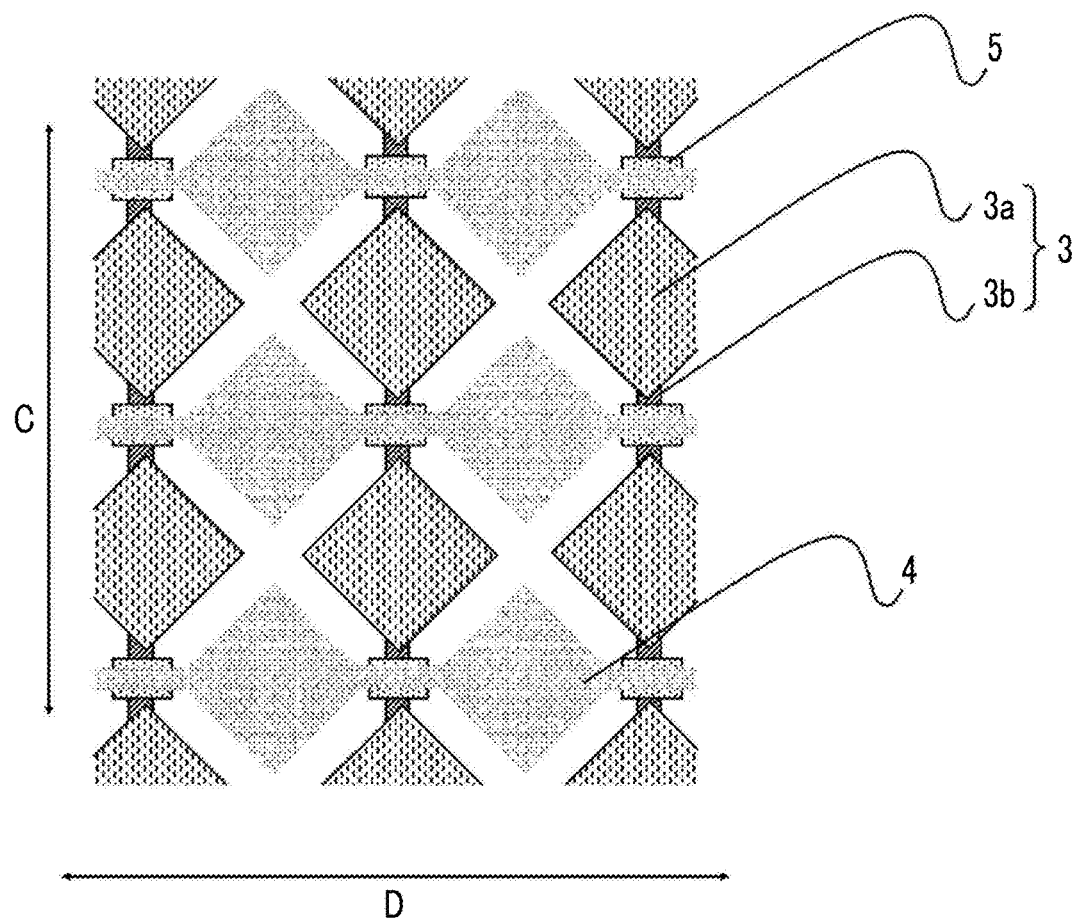
FIG. 8 is an explanatory diagram illustrating one example of a first transparent electrode pattern and a second transparent electrode pattern of the touch panel of the present invention.

The first transparent electrode pattern 3 and the second transparent electrode pattern 4 will be described by using FIG. 8. FIG. 8 is an explanatory diagram illustrating one example of the first transparent electrode pattern and the second transparent electrode pattern of the present invention. As illustrated in FIG. 8, the first transparent electrode pattern 3 is formed by allowing a pad portion 3a to extend in the first direction through a connection portion 3b. In addition, the second transparent electrode pattern 4 is electrically insulated from the first transparent electrode pattern 3 by the insulating layer 5, and is configured of a plurality of pad portions formed by extending in a direction intersecting with the first direction (a second direction in FIG. 8). Here, in a case where the first transparent electrode pattern 3 is formed, the pad portion 3a and the connection portion 3b may be prepared by being integrated with each other, or only the connection portion 3b is prepared, and the pad portion 3a and the second transparent electrode pattern 4 may be prepared (patterned) by being integrated with each other. In a case where the pad portion 3a and the second transparent electrode pattern 4 are prepared (patterned) by being integrated with each other, as illustrated in FIG. 8, each layer is formed such that a part of the connection portion 3b is connected to a part of the pad portion 3a, and the first transparent electrode pattern 3 is electrically insulated from the second transparent electrode pattern 4 by the insulating layer 5.

In FIG. 5 and FIG. 6, the conductive element 6 is disposed on the surface of the light shielding layer 2b on a side opposite to the front plates 1 and/or 1G. The conductive element 6 is electrically connected to at least one of the first transparent electrode pattern 3 or the second transparent electrode pattern 4, and is another element different from the first transparent electrode pattern 3 and the second transparent electrode pattern 4. In FIG. 5 and FIG. 6, it is illustrated that the conductive element 6 is connected to the second transparent electrode pattern 4.

In addition, in FIG. 5 and FIG. 6, the transparent protective layer 7 is disposed to cover all constituents. The transparent protective layer 7 may be configured to cover only a part of each of the constituents. The insulating layer 5 and the transparent protective layer 7 may be formed of the same material, or may be formed of different materials. A material having high surface hardness and high heat resistance is preferable as the material configuring the insulating layer 5 and the transparent protective layer 7, and a known photosensitive siloxane resin material, a known acrylic resin material, and the like are used.

Figure 9:
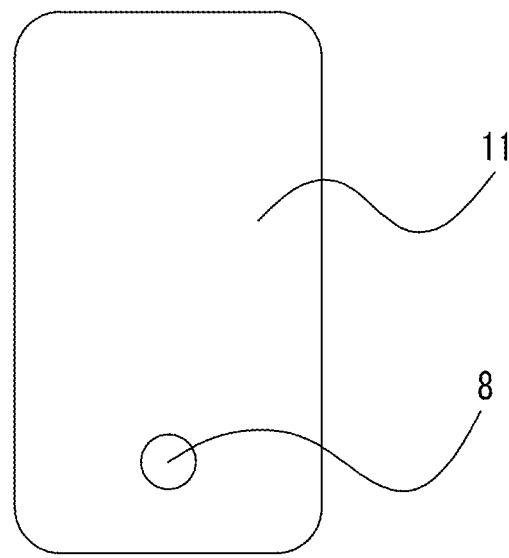
FIG. 9 is a top view illustrating one example of reinforced glass in which an opening portion is formed.
Figure 10:
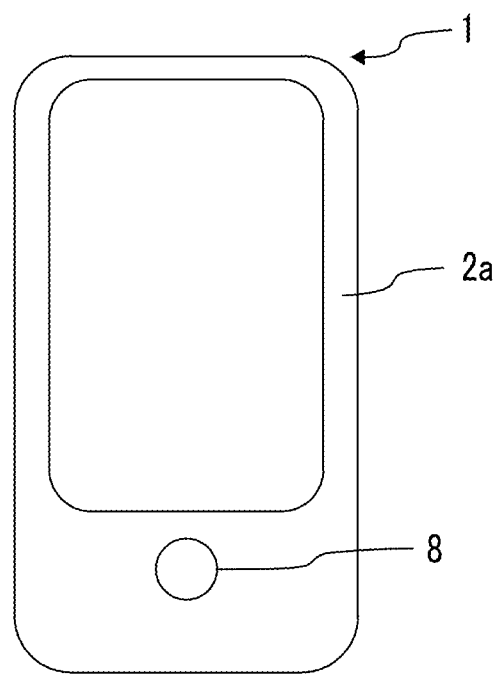
FIG. 10 is a top view illustrating one example of the touch panel of the present invention in which a decorative material and a light shielding layer are formed.
Figure 11:
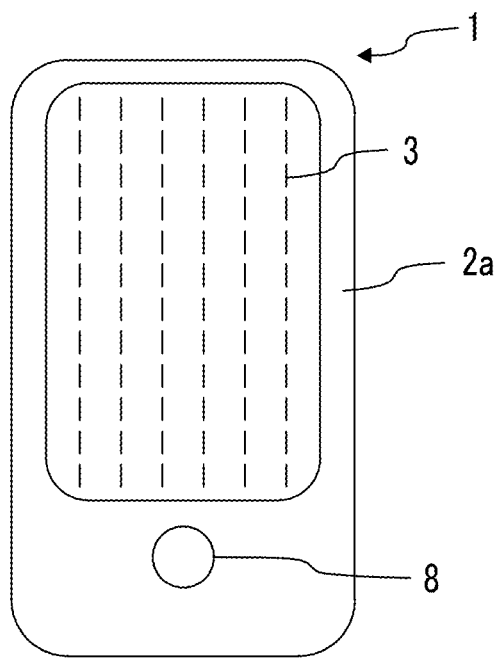
FIG. 11 is a top view illustrating one example of the touch panel of the present invention in which the first transparent electrode pattern is formed.
Figure 12:
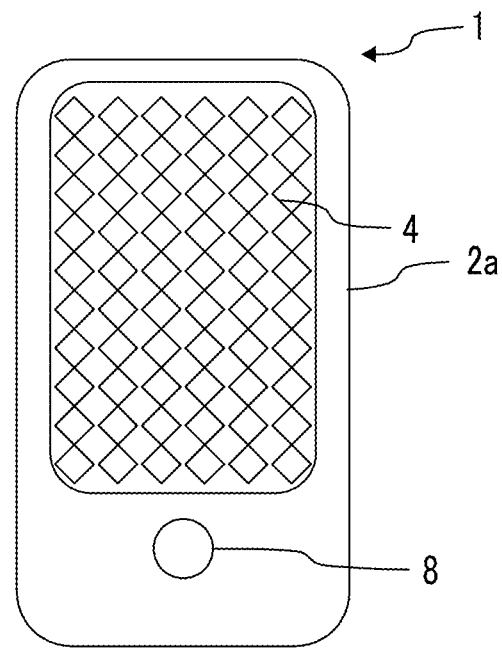
FIG. 12 is a top view illustrating one example of the touch panel of the present invention in which the first transparent electrode pattern and the second transparent electrode pattern are formed.
Figure 13:
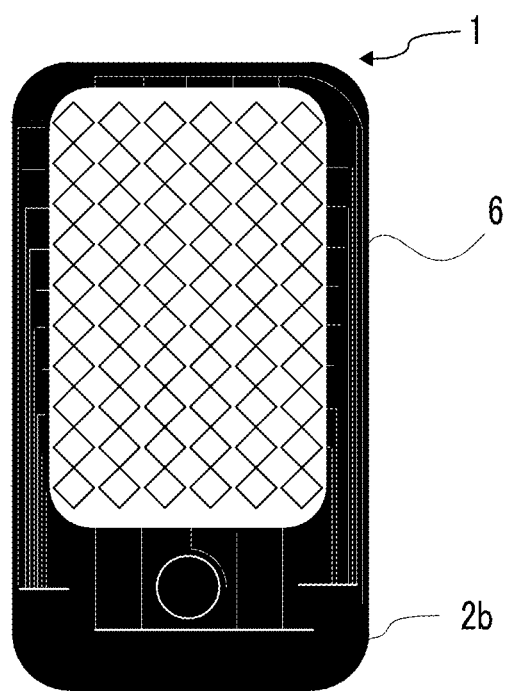
FIG. 13 is a top view illustrating one example of the touch panel of the present invention in which a conductive element different from the first transparent electrode pattern and the second transparent electrode pattern is formed.

Examples of an aspect formed in a procedure of the manufacturing method of the present invention are able to include aspects in FIGS. 9 to 13. FIG. 9 is a top view illustrating one example of reinforced glass 11 in which the opening portion 8 is formed. FIG. 10 is a top view illustrating one example of the front plate on which the decorative material 2a formed by heating the colored layer is formed. FIG. 11 is a top view illustrating one example of the front plate on which the first transparent electrode pattern 3 is formed. FIG. 12 is a top view illustrating one example of the front plate on which the second transparent electrode pattern 4 is formed. FIG. 13 is a top view illustrating one example of the front plate on which the conductive element 6 different from the first transparent electrode pattern and the second transparent electrode pattern is formed. These examples illustrate an example in which the above description is specified, and the range of the present invention is not restrictively interpreted by the drawings.

Configurations disclosed in "Latest Touch Panel Technology" (published by THE TECHNO TIMES INC. on Jul. 6, 2009), "Technology and Development of Touch Panel" which is edited by Yuji MITANI and published by CMC Publishing Co., Ltd. (December, 2004), FPD International 2009 Forum T-11 Lecture Textbook, APPLICATION NOTE AN2292 of Cypress Semiconductor Corporation, and the like are able to be applied to the capacitance type input device and an image display device including the capacitance type input device as a constituent.

[Information Display Device]

An information display device of the present invention includes the touch panel of the present invention. It is effective that the touch panel of the present invention is used as an OGS type touch panel.

A mobile device is preferable as the information display device which is able to use the touch panel of the present invention, and examples of the information display device are able to include information display devices described below.

iPhone 4 (Registered Trademark) and iPad (Registered Trademark) (manufactured by Apple Inc.), Xperia (SO-01B) (manufactured by Sony Mobile Communications Inc.), Galaxy S (SC-02B) and Galaxy Tab (SC-01C) (manufactured by Samsung Electronics Co., Ltd.), BlackBerry 8707h (manufactured by Research In Motion Limited), Kindle (manufactured by Amazon.com, Inc.), and Kobo Touch (manufactured by Rakuten, Inc.).

EXAMPLES

Hereinafter, the characteristics of the present invention will be described in detail with reference to the examples and comparative examples. Materials, use amounts, ratios, treatment contents, treatment sequences, and the like of the following examples are able to be suitably changed unless the changes cause deviance from the gist of the present invention. Accordingly, the range of the present invention will not be restrictively interpreted by the following specific examples.

Furthermore, unless otherwise particularly stated, "parts" indicates "parts by mass", and wt % indicates mass %.

Examples 1 to 27 and Comparative Examples 1 to 4

<Preparation of Pigment Dispersion Liquid>
(Material of Pigment Dispersant)
A-1 which is used as an A component (mercapto modified dimethyl polysiloxane) of the material of the pigment dispersant is KF-2001 (manufactured by Shin-Etsu Chemical Co., Ltd.), and A-2 is KF-2004 (manufactured by Shin-Etsu Chemical Co., Ltd.).

A-1 and A-2 respectively have a structure denoted by General Formula described below ($R^A$ represents an arbitrary linking group, and a1 and a2 represent a natural number), A-1 is a functional group equivalent weight of 1,900 (g/mol), and A-2 is a functional group equivalent weight of 30,000 (g/mol).

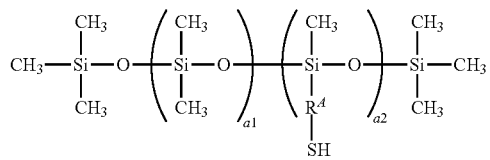

B-1 which is used as a B component (a silicone macro monomer) of the material of the pigment dispersant is X-22-174ASX (manufactured by Shin-Etsu Chemical Co., Ltd.), B-2 is X-22-174BX (manufactured by Shin-Etsu Chemical Co., Ltd.), and B-3 is KF-2012 (manufactured by Shin-Etsu Chemical Co., Ltd.). B-1, B-2, and B-3 respectively have a structure denoted by General Formula described below (R represents an arbitrary substituent or an arbitrary linking group, and n represents a natural number), B-1 is a functional group equivalent weight of 900 (g/mol), B-2 is a functional group equivalent weight of 2,300 (g/mol), and B-3 is a functional group equivalent weight of 4,600 (g/mol).

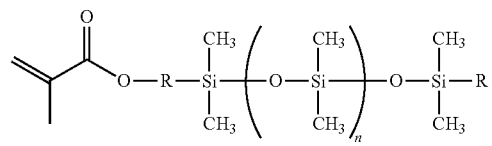

C-1, C-3, C-7, C-9, C-14, C-19, and C-22 which are used as a C component (a polymerization component including a pigment adsorption portion) of the material of the pigment dispersant is a compound having a structure denoted by General Formula described below.

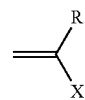

In General Formula described above, structures represented by R and X of C-1, C-3, C-7, C-9, C-14, C-19, and C-22 are respectively shown in Table 1 described below.

Furthermore, in Table 1 described below, structures represented by R and X of C-2, C-4 to C-6, C-8, C-11 to C-13, C-15 to C-18, C-20, C-21, and C-23 to C-31 which are other materials capable of being used as the C component of the material of the pigment dispersant are shown.

TABLE 1

| | R | X |
|---|---|---|
| C-1 | $CH_3$ | COOH |
| C-2 | H | COOH |
| C-3 | $CH_3$ | $COOC_2H_4OCOC_2H_2COOH$ |
| C-4 | H | $C_8H_{16}COOH$ |
| C-5 | H | $C_6H_4COOH$ |
| C-6 | $CH_3$ | $COOC_2H_4OCOC_6H_4COOH$ |
| C-7 | $CH2COOH$ | COOH |
| C-8 | $CH_3$ | $PO_3H_2$ |
| C-9 | H | $PO_3H_2$ |
| C-10 | $CH_3$ | $COOC_2H_2OPO_3H_2$ |
| C-11 | $CH_3$ | $COOC_2H_2PO_3H_2$ |
| C-12 | $CH_3$ | $SO_3H$ |
| C-13 | H | $SO_3H$ |
| C-14 | $CH_3$ | $CONHCH_2C(CH_3)_2SO_3H$ |
| C-15 | H | $C_6H_4SO_3H$ |
| C-16 | $CH_3$ | $COOC_2H_2OH$ |
| C-17 | $CH_3$ | $COOC_2CH(OH)CH_2OH$ |
| C-18 | $CH_3$ | $COOC_2H_2OCOC_2H_2COCH_3$ |
| C-19 | $CH_3$ | $COOC_2H_2N(CH_3)_2$ |
| C-20 | $CH_3$ | $COOC_2H_2NHCONHC_3H_7$ |
| C-21 | $CH_3$ | 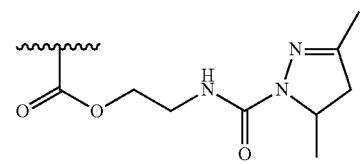 [SMILES: *C(=O)OCCNC(=O)N1N=C(C)CC1C] |
| C-22 | $CH_3$ | $COOC_3H_6Si(OCH_3)_3$ |
| C-23 | H | $COOC_3H_6Si(OCH_3)_3$ |
| C-24 | $CH_3$ | $COOC_3H_6Si(OC_2H_5)_3$ |
| C-25 | H | $COOC_3H_6Si(OC_2H_5)_3$ |
| C-26 | H | $Si(OCH_3)_3$ |
| C-27 | H | $Si(OC_2H_5)_3$ |
| C-28 | $CH_3$ | $CONHC_3H_6N(CH_3)_2$ |

TABLE 1-continued

| | R | X |
|---|---|---|
| C-29 | H | $C_6H_4NH_2$ |
| C-30 | $CH_3$ | $COOCH_2COCH_2COCH_3$ |
| C-31 | $CH_3$ | $COOC_2H_2OCOC_6H_{10}COOH$ |

(Synthesis of Pigment Dispersant X-1)

A-1 described above (KF-2001, manufactured by Shin-Etsu Chemical Co., Ltd.) which is mercapto modified dimethyl polysiloxane, B-1 described above (X-22-174ASX, manufactured by Shin-Etsu Chemical Co., Ltd.) which is a silicone macro monomer, and C-1 described above (a methacrylic acid) as the polymerization component including the pigment adsorption portion were dissolved in xylene according to Table 2 described below, and a polymerization initiator (dimethyl-2,2'-azobis(2-methyl propionate), "V-601") was dissolved at a ratio of 0.3 mol % with respect to the total polymerization component, and polymerization was performed at 80° C. under a nitrogen atmosphere. In the middle of the polymerization, a polymerization initiator (V-601) was added at a ratio of 0.3 mol % with respect to the total polymerization component every two hours after the polymerization is initiated, and the polymerization was performed for total 8 hours. After the polymerization, a purification treatment and drying were performed, and thus, a pigment dispersant X-1 was obtained. The obtained pigment dispersant X-1 was set to a graft type silicone polymer of Example 1.

(Synthesis of Pigment Dispersants X-2 to X-23 and X-26 to 28)

In the synthesis of the pigment dispersant X-1, pigment dispersants X-2 to X-23 and X-26 to 28 were respectively obtained by the same method as that of the pigment dispersant X-1 except that the A component, the B component, the C component, and the ratio thereof (a copolymerization ratio) of the material of the pigment dispersant were changed according to Table 2 described below.

Furthermore, in the synthesis of the pigment dispersant X-23, the C component was not added.

The pigment dispersants X-2 to X-23 and X-26 to 28 have a structure denoted by General Formula 1 described above. The obtained pigment dispersants X-2 to X-23 and X-26 to 28 were set to graft type silicone polymers of each of the examples.

(Synthesis of Pigment Dispersant X-24)

In the synthesis of the pigment dispersant X-1, a pigment dispersant X-24 was obtained by the same method as that of the pigment dispersant X-1 except that the ratio of the A component and the C component (a copolymerization ratio) of the material of the pigment dispersant was changed according to Table 2 described below, and 22.5 mass % of isobutyl methyl methacrylate (IBMA) as a D component was added instead of the B component, and then, the polymerization initiator was added.

The pigment dispersant X-24 has the same composition as that of a graft type silicone polymer disclosed in <0054> of JP2008-274116A, has n of 0 in General Formula 1 described above, and is a pigment dispersant for a comparative example.

(Synthesis of Pigment Dispersant X-25)

In the synthesis of the pigment dispersant X-1, a pigment dispersant X-25 was obtained by the same method as that of the pigment dispersant X-1 except that 49.3 mass % of tricyclodecanyl methacrylate (TCDMA), 37.6 mass % of cyclohexyl methacrylate (CHMA), and 13.1 mass % of methyl methacrylate (MMA) were added instead of the A component, the B component, and the C component of the material of the pigment dispersant according to Table 2 described below, and then, the polymerization initiator was added.

The pigment dispersant X-25 is an example of a general graft type polymer having a structure in which a silicone chain is not included in a side chain, and is a pigment dispersant for a comparative example.

(Molecular Weight of Pigment Dispersant)

Weight-average molecular weights (Mw) and number average molecular weights (Mn) of the pigment dispersants X-1 to 23 and X-26 to 28, and a number average molecular weight (Mn) of the pigment dispersant X-25 were measured by using a gel permeation chromatography (GPC). The results were shown in Table 2 described below. The details of a column or the like used in GPC will be described below.

Column: GPC Column TSKgelSuper HZM-H (manufactured by TOSOH CORPORATION)

Solvent: Tetrahydrofuran

Standard Substance: Monodispersed Polystyrene (Preparation of Pigment Dispersion Liquid)

In Examples 1 to 23 and Comparative Examples 1 and 2, the pigment dispersant, titanium oxide which is a white pigment (rutile type titanium oxide particles subjected to a surface treatment with alumina and zirconia, and a primary particle diameter of 0.25 μm), and xylene were mixed at a ratio shown in Table 2 described below, and were dispersed for 2 hours with a beads mill by using zirconia beads having a diameter of 0.5 mm, and thus, pigment dispersion liquids of Examples 1 to 23 and Comparative Examples 1 and 2 were obtained.

In Examples 24 to 27 and Comparative Examples 3 and 4, the pigment dispersant, carbon black which is a black pigment (also referred to as carbon; manufactured by Mitsubishi Chemical Corporation), and xylene were mixed at a ratio shown in Table 2 described below, and were dispersed for 3 hours with a beads mill by using zirconia beads having a diameter of 0.5 mm, and thus, pigment dispersion liquids of Examples 24 to 27 and Comparative Examples 3 and 4 were obtained.

<Evaluation of Viscosity (Dispersibility) of Pigment Dispersion Liquid>

(Initial Viscosity)

An initial viscosity and a viscosity after being aged for one week of the obtained pigment dispersion liquids of each of the examples and the comparative examples were measured under an environment of 25° C. by the following method.

The viscosity was measured under an environment of 25° C. by using a cone plate type viscometer (manufactured by Toki Sangyo Co., Ltd., Type Number of RE-85L).

The initial viscosity of the obtained pigment dispersion liquid which was measured by the method described above was shown in Table 2 described below.

(Dispersibility)

The viscosity of the pigment dispersion liquid of each of the example and the comparative examples after being aged for one week was evaluated such that a viscosity of less than or equal to 2 times the initial viscosity of the pigment dispersion liquids of each of the example and the comparative examples was set to dispersibility A, a viscosity of greater than 2 times and less than 3 times the initial viscosity of the pigment dispersion liquids of each of the example and the comparative examples was set to dispersibility B, and a viscosity of greater than or equal to 3 times the initial viscosity of the pigment dispersion liquids of each of the example and the comparative examples was set to dispersibility C.

It is necessary that the dispersibility evaluation is evaluation A or B for practical use, and the evaluation A is preferable.

The results were shown in Table 2 described below.

<Preparation of White Decorative Material>
(Preparation of White Layer Coating Sample)

15.7 parts of each of the obtained pigment dispersion liquids of Examples 1 to 23 and Comparative Examples 1 and 2 was mixed with 82.4 parts of a silicone resin solution (KR251, manufactured by Shin-Etsu Chemical Co., Ltd.), 0.11 parts of a coating auxiliary agent (F-780F, manufactured by DIC Corporation), and 1.7 parts of methyl ethyl ketone, and spin coating was performed on a white plate glass having a thickness of 0.7 mm such that a dried film thickness became 35 μm, and thus, white layer coating samples for evaluation of each of the example and the comparative examples were prepared.

(Preparation of White Decorative Material)

After that, the white layer coating samples of each of the example and the comparative examples were subjected to a heat treatment three times at 150° C. for 30 minutes, at 240° C. for 30 minutes, and at 280° C. for 40 minutes in this order, and the samples which had been subjected to the heat treatment three times were set to samples for heat resistance evaluation of each of the example and the comparative examples. The obtained samples for heat resistance evaluation after being subjected to the heat treatment were set to white decorative materials of each of the example and the comparative examples.

(Heat Resistance Evaluation Using Coloration)

A reflection spectrum of the samples for heat resistance evaluation of each of the example and the comparative examples on the glass side was measured by using a spectrophotometer with an integrating sphere, and color coordinates L*a*b* were calculated on the basis of the measured reflection spectrum. L* mainly indicates brightness of the samples for heat resistance evaluation, a* mainly indicates redness of the samples for heat resistance evaluation, and b* mainly indicates a yellow tint of the samples for heat resistance evaluation.

Evaluation was performed as follows by using b* which is easily affected by a heat treatment as an index.

b*≤−0.1 . . . Heat Resistance A
−0.1<b*≤0.5 . . . Heat Resistance B
0.5<b*≤1 . . . Heat Resistance C
b*>1 . . . Heat Resistance D It is necessary that heat resistance evaluation using coloration is evaluation A, B, or C for practical use, and the evaluation A or B is preferable, and the evaluation A is more preferable.

The obtained results were shown in Table 2 described below.

<Preparation of Black Decorative Material>
(Preparation of Black Layer Coating Sample)

The obtained pigment dispersion liquids of Examples 24 to 27 and Comparative Examples 3 and 4 were mixed by the following formulation, film formation was performed by the following method, and thus, black layer coating samples for evaluation of each of the example and the comparative examples were prepared.

15.7 parts of each of the obtained pigment dispersion liquids of Examples 24 to 27 and Comparative Examples 3 and 4 was mixed with 82.4 parts of a silicone resin solution (KR251, manufactured by Shin-Etsu Chemical Co., Ltd.), 0.11 parts of a coating auxiliary agent (F-780F, manufactured by DIC Corporation), and 1.7 parts of methyl ethyl ketone, and spin coating was performed on a white plate glass having a thickness of 0.7 mm such that a dried film thickness became 35 μm, and thus, black layer coating samples for evaluation of each of the example and the comparative examples were prepared.

(Preparation of Black Decorative Material)

After that, the black layer coating samples of each of the example and the comparative examples were subjected to a heat treatment three times at 150° C. for 30 minutes, at 240° C. for 30 minutes, and at 280° C. for 40 minutes in this order, and the samples which had been subjected to the heat treatment three times were set to samples for heat resistance evaluation of each of the example and the comparative examples. The obtained samples for heat resistance evaluation after being subjected to the heat treatment were set to black decorative materials of each of the example and the comparative examples.

(Heat Resistance Evaluation Using Film Physical Properties)

Film physical properties of the samples for heat resistance evaluation of each of the example and the comparative examples were measured by the following method, and evaluation was performed. The details of the measurement method and the evaluation criteria will be described below.

Whether or not a crack occurred on the samples for heat resistance evaluation after being subjected to the heat treatment was visually observed, and a case where no crack occurred was evaluated as A, and a case where a crack occurred was evaluated as B.

The obtained results were shown in Table 2 described below.

TABLE 2

| | | Pigment Dispersion Liquid Pigment Dispersant | | | | | | |
|---|---|---|---|---|---|---|---|---|
| | | Copolymerization Ratio | | | | Molecular Weight | | Added |
| | | | | | | Mw | Mn | Amount |
| | Type | A/Mass % | B/Mass % | C/Mass % | D/Mass % | (10,000) | (10,000) | (Mass %) |
| Example 1 | X-1 | A-1/88.4 wt % | B-1/8.4 wt % | C-1/3.2 wt % | — | 2.5 | 1.3 | 3.5 |
| Example 2 | X-2 | A-1/85.2 wt % | B-1/12.1 wt % | C-1/2.7 wt % | — | 2.5 | 1.3 | 3.5 |
| Example 3 | X-3 | A-1/79.4 wt % | B-1/18.8 wt % | C-1/1.8 wt % | — | 2.5 | 1.3 | 3.5 |
| Example 4 | X-4 | A-1/73.2 wt % | B-1/26.0 wt % | C-1/0.8 wt % | — | 2.5 | 1.3 | 3.5 |
| Example 5 | X-5 | A-1/71.7 wt % | B-2/26.0 wt % | C-1/2.3 wt % | — | 3.4 | 1.6 | 3.5 |
| Example 6 | X-6 | A-1/61.4 wt % | B-2/37.2 wt % | C-1/1.4 wt % | — | 3.4 | 1.6 | 3.5 |

TABLE 2-continued

| | | | | | | | | |
|---|---|---|---|---|---|---|---|---|
| Example 7 | X-7 | A-1/57.3 wt % | B-2/41.6 wt % | C-1/1.0 wt % | — | 3.4 | 1.6 | 3.5 |
| Example 8 | X-8 | A-1/56.9 wt % | B-3/41.3 wt % | C-1/1.8 wt % | — | 4.4 | 2.3 | 3.5 |
| Example 9 | X-9 | A-1/44.8 wt % | B-3/54.2 wt % | C-1/1.0 wt % | — | 4.4 | 2.3 | 3.5 |
| Example 10 | X-10 | A-1/40.5 wt % | B-3/58.8 wt % | C-1/0.7 wt % | — | 4.4 | 2.3 | 3.5 |
| Example 11 | X-11 | A-1/47.3 wt % | B-3/51.8 wt % | C-1/1.0 wt % | — | 3.7 | 2.1 | 3.5 |
| Example 12 | X-12 | A-1/44.3 wt % | B-3/54.9 wt % | C-1/0.8 wt % | — | 3.6 | 2.3 | 3.5 |
| Example 13 | X-13 | A-1/45.8 wt % | B-3/53.3 wt % | C-1/0.9 wt % | — | 3.7 | 2 | 3.5 |
| Example 14 | X-14 | A-1/48.9 wt % | B-3/50.1 wt % | C-1/1.1 wt % | — | 3.8 | 2.2 | 3.5 |
| Example 15 | X-15 | A-1/50.7 wt % | B-3/48.2 wt % | C-1/1.2 wt % | — | 3.8 | 2.3 | 3.5 |
| Example 16 | X-16 | A-1/77.1 wt % | B-1/18.3 wt % | C-3/4.7 wt % | — | 2.5 | 1.3 | 3.5 |
| Example 17 | X-17 | A-1/79.0 wt % | B-1/18.8 wt % | C-7/1.9 wt % | — | 2 | 0.8 | 3.5 |
| Example 18 | X-18 | A-1/79.0 wt % | B-1/18.7 wt % | C-9/2.2 wt % | — | 2.5 | 1.3 | 3.5 |
| Example 19 | X-19 | A-1/76.8 wt % | B-1/18.2 wt % | C-22/5.0 wt % | — | 2.5 | 1.3 | 3.5 |
| Example 20 | X-20 | A-1/88.4 wt % | B-1/8.4 wt % | C-14/3.2 wt % | — | 2.5 | 1.3 | 3.5 |
| Example 21 | X-21 | A-1/88.4 wt % | B-1/8.4 wt % | C-19/3.2 wt % | — | 2.5 | 1.3 | 3.5 |
| Example 22 | X-22 | A-2/88.4 wt % | B-1/8.4 wt % | C-1/3.2 wt % | — | 3.7 | 1.7 | 3.5 |
| Example 23 | X-23 | A-1/91.3 wt % | B-1/8.7 wt % | — | — | 2.4 | 1.2 | 3.5 |
| Comparative Example 1 | X-24 | A-1/70 wt % | — | C-1/7.5 wt % | IBMA/22.5 wt % | — | — | 3.5 |
| Comparative Example 2 | X-25 | — | — | — | TCDMA/CHMA/MAA = 49.3/37.6/13.1 | — | 1 | 3.5 |
| Example 24 | X-1 | A-1/88.4 wt % | B-1/8.4 wt % | C-1/3.2 wt % | — | 2.5 | 1.3 | 5.5 |
| Example 25 | X-26 | A-1/63.8 wt % | B-2/34.8 wt % | C-1/1.3 wt % | — | 2.7 | 1.7 | 5.5 |
| Example 26 | X-27 | A-1/61.7 wt % | B-2/37.2 wt % | C-1/1.1 wt % | — | 2.7 | 1.6 | 5.5 |
| Example 27 | X-28 | A-1/68.4 wt % | B-2/30.0 wt % | C-1/1.7 wt % | — | 2.7 | 1.7 | 5.5 |
| Comparative Example 3 | X-24 | A-1/70 wt % | — | C-1/7.5 wt % | IBMA/22.5 wt % | — | — | 5.5 |
| Comparative Example 4 | X-25 | — | — | — | TCDMA/CHMA/MAA = 49.3/37.6/13.1 | — | 1 | 5.5 |

| | Pigment Dispersion Liquid | | | | Decorative Material Evaluation | |
|---|---|---|---|---|---|---|
| | Pigment | | Solvent | Evaluation Viscosity | Heat Resistance | |
| | Type | Added Amount (Mass %) | (Mass %) | Initial Viscosity (mPa·s) | Dispersibility | Coloration | Crack |
| Example 1 | $TiO_2$ | 70 | 26.5 | 60 | A | A | — |
| Example 2 | $TiO_2$ | 70 | 26.5 | 60 | A | A | — |
| Example 3 | $TiO_2$ | 70 | 26.5 | 60 | A | A | — |
| Example 4 | $TiO_2$ | 70 | 26.5 | 100 | A | A | — |
| Example 5 | $TiO_2$ | 70 | 26.5 | 100 | A | A | — |
| Example 6 | $TiO_2$ | 70 | 26.5 | 100 | A | A | — |
| Example 7 | $TiO_2$ | 70 | 26.5 | 100 | A | A | — |
| Example 8 | $TiO_2$ | 70 | 26.5 | 100 | A | A | — |
| Example 9 | $TiO_2$ | 70 | 26.5 | 100 | A | A | — |
| Example 10 | $TiO_2$ | 70 | 26.5 | 100 | A | A | — |
| Example 11 | $TiO_2$ | 70 | 26.5 | 100 | A | A | — |
| Example 12 | $TiO_2$ | 70 | 26.5 | 100 | A | A | — |
| Example 13 | $TiO_2$ | 70 | 26.5 | 100 | A | A | — |
| Example 14 | $TiO_2$ | 70 | 26.5 | 100 | A | A | — |
| Example 15 | $TiO_2$ | 70 | 26.5 | 100 | A | A | — |
| Example 16 | $TiO_2$ | 70 | 26.5 | 60 | A | A | — |
| Example 17 | $TiO_2$ | 70 | 26.5 | 60 | A | A | — |
| Example 18 | $TiO_2$ | 70 | 26.5 | 60 | A | A | — |
| Example 19 | $TiO_2$ | 70 | 26.5 | 60 | A | A | — |
| Example 20 | $TiO_2$ | 70 | 26.5 | 60 | A | B | — |
| Example 21 | $TiO_2$ | 70 | 26.5 | 60 | A | B | — |
| Example 22 | $TiO_2$ | 70 | 26.5 | 60 | A | A | — |
| Example 23 | $TiO_2$ | 70 | 26.5 | 60 | B | A | — |
| Comparative Example 1 | $TiO_2$ | 70 | 26.5 | 80 | A | C | — |
| Comparative Example 2 | $TiO_2$ | 70 | 26.5 | — | C | D | — |
| Example 24 | Carbon | 68 | 26.5 | 100 | A | — | A |
| Example 25 | Carbon | 68 | 26.5 | 100 | A | — | A |
| Example 26 | Carbon | 68 | 26.5 | 100 | A | — | A |
| Example 27 | Carbon | 68 | 26.5 | 100 | A | — | A |
| Comparative Example 3 | Carbon | 68 | 26.5 | — | C | — | B |
| Comparative Example 4 | Carbon | 68 | 26.5 | — | C | — | B |

From Table 2 described above, it was found that in the pigment dispersion liquid of the present invention, dispersibility of the pigment was excellent, and heat resistance was excellent.

From Comparative Examples 1 and 3, it was found that in the pigment dispersion liquid using the pigment dispersant which is a polymerization product of mercapto modified dimethyl polysiloxane and the methacrylic acid, and does not have a silicone chain grafted on a side chain, dispersibility was not excellent, and heat resistance also deteriorated.

TABLE 3

|  | Black Coloring Liquid 1 | Black Coloring Liquid 2 | Black Coloring Liquid 3 |
|---|---|---|---|
| Black Dispersion Liquid 1 | 240.0 | 240.0 | 240.0 |
| Silicone Resin Solution 1 | 130.2 | 127.5 |  |
| Silicone Resin Solution 2 | 108.5 | 106.2 |  |
| Silicone Resin Solution 3 |  |  | 255.0 |
| Polymerization Catalyst 1 |  | 11.3 | 11.1 |
| Coating Auxiliary Agent | 0.24 | 0.24 | 0.24 |
| Cyclohexanone | 269.1 | 269.1 | 247.9 |
| Methyl Ethyl Ketone | 251.8 | 245.8 | 245.8 |
| Total | 999.84 | 1000.14 | 1000.04 |

TABLE 4

|  | White Coloring Agent 1 | White Coloring Agent 2 | White Coloring Agent 3 | White Coloring Agent 4 | White Coloring Agent 5 | White Coloring Agent 6 | White Coloring Agent 7 | White Coloring Agent 8 | White Coloring Agent 9 | White Coloring Agent 10 | White Coloring Agent 11 | White Coloring Agent 12 |
|---|---|---|---|---|---|---|---|---|---|---|---|---|
| Pigment Dispersion Liquid of Example 1 | 167.1 | 167.1 | 167.1 | 167.1 | 167.1 | 167.1 | 167.1 | 167.1 | 167.1 | 370.9 | 370.9 | 314.3 |
| Silicone Resin Solution 1 |  |  |  |  |  |  |  |  |  | 187.8 | 313.0 |  |
| Silicone Resin Solution 2 |  |  |  |  |  |  |  |  |  | 365.2 | 260.8 |  |
| Silicone Resin Solution 3 |  |  |  |  |  |  |  |  |  |  |  | 530.5 |
| Silicone Resin Solution 4 | 772.1 | 764.5 | 735.4 | 701.9 | 671.4 | 643.5 | 764.5 | 764.5 | 764.5 |  |  |  |
| Silicone Resin Solution 5 | 22.1 | 21.8 | 21.0 | 20.1 | 19.2 | 18.4 | 21.8 | 21.8 | 21.8 |  |  |  |
| Polymerization Catalyst 1 |  | 7.0 | 33.6 | 64.2 | 92.1 | 117.7 |  |  |  | 12.5 | 12.5 | 10.6 |
| Polymerization Catalyst 2 |  |  |  |  |  |  | 1.7 |  |  |  |  |  |
| Polymerization Catalyst 3 |  |  |  |  |  |  |  | 1.7 |  |  |  |  |
| Polymerization Catalyst 4 | 0.3 | 0.3 | 0.3 | 0.3 | 0.3 | 0.3 | 0.3 | 0.3 | 1.7 | 0.6 | 0.6 | 0.5 |
| Antioxidant |  |  |  |  |  |  |  |  | 0.3 |  |  |  |
| Coating Auxiliary Agent | 1.2 | 1.2 | 1.2 | 1.2 | 1.2 | 1.2 | 1.2 | 1.2 | 1.2 | 2.4 | 2.4 | 2.0 |
| Methyl Ethyl Ketone | 37.2 | 38.0 | 41.4 | 45.2 | 48.7 | 51.9 | 43.3 | 43.3 | 43.3 | 60.7 | 39.9 | 142.1 |

From Comparative Examples 2 and 4, it was found that in the pigment dispersion liquid using the general graft type polymer which does not have mercapto modified dimethyl polysiloxane in the main chain and the side chain, the dispersibility of the pigment was not excellent, and heat resistance also deteriorated.

Examples 101 to 114

<Preparation of White Decorative Material Using Pigment Dispersion Liquid of Present Invention>

(Preparation of Black Coloring Liquid and White Coloring Liquid for Light Shielding Layer)

Black coloring liquids 1 to 3 for a light shielding layer shown in Table 3 described below and white coloring liquids 1 to 12 shown in Table 4 described below were prepared by using the following materials. The numerical values in Table 3 and Table 4 indicate parts by mass.

Black Dispersion Liquid 1 (GC4151, manufactured by Sanyo Color Works, LTD., Cyclohexanone Dispersion Liquid of Carbon Black (Non-Volatile Content of 20.7 mass %))

Silicone Resin Solution 1 (KR300, manufactured by Shin-Etsu Chemical Co., Ltd., Xylene Solution of Silicone Resin (Non-Volatile Content of 50 mass %))

Silicone Resin Solution 2 (KR311, manufactured by Shin-Etsu Chemical Co., Ltd., Xylene Solution of Silicone Resin (Non-Volatile Content of 60 mass %))

Silicone Resin Solution 3 (KR255, manufactured by Shin-Etsu Chemical Co., Ltd., Xylene Solution of Silicone Resin (Non-Volatile Content of 50 mass %))

Silicone Resin Solution 4 (KR251, manufactured by Shin-Etsu Chemical Co., Ltd., Toluene Solution of Silicone Resin (Non-Volatile Content of 20 mass %))

Silicone Resin Solution 5 (X-40-9246, manufactured by Shin-Etsu Chemical Co., Ltd., Silicone Oligomer (100 mass %))

Polymerization Catalyst 1 (D-15, manufactured by Shin-Etsu Chemical Co., Ltd., Xylene Solution of Zinc-Containing Catalyst (Solid Content of 25 mass %))
Polymerization Catalyst 2 (Iron (III) Triacetyl Acetonate)
Polymerization Catalyst 3 (Aluminum (III) Triacetyl Acetonate)
Polymerization Catalyst 4 (Dibutoxy Zirconium (IV) Diacetyl Acetonate)
Antioxidant (IRGAFOS 168, manufactured by BASF SE, Compound Described below)

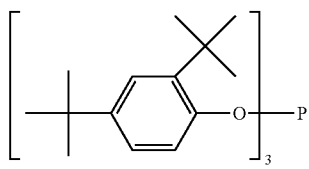

Coating Auxiliary Agent (MEGAFAC F-780F, manufactured by DIC Corporation, Methyl Ethyl Ketone Solution of Surfactant (Non-Volatile Content of 30 mass %))

<Preparation of Transfer Material for Forming Decorative Material>

<<Preparation of Peeling Film>>

A peeling film described below was prepared as a temporary support with a peeling layer of a transfer material.

UNIPEEL TR6 (manufactured by UNITIKA LTD., an olefin-based peeling layer is provided on a PET film having a thickness of 75 μm, the peeling layer contains a matting agent, and the surface of the peeling layer was upraised by 200 nm due to the matting agent)

<<Preparation of Protective Film>>

Next, a protective film described below was prepared.

ALPHAN E-501 (manufactured by Oji F-Tex Co., Ltd., Polypropylene Film Having Thickness of 12 μm)

<Preparation of Color Material Layer (Transfer Layer Formed of Light Shielding Layer and White Colored Layer) on Temporary Support>

Any one of the black coloring liquids 1 to 3 for a light shielding layer which are for forming the light shielding layer and are shown in the table described above was applied onto the peeling layer of the temporary support with the peeling layer by using an extrusion type coater such that a dried thickness became 3.0 μm, and was dried.

Any one of the white coloring liquids 1 to 12 which are for forming the white colored layer and are shown in the table described above was applied onto the light shielding layer such that a dried thickness became 35.0 μm, and was dried. The protective film described above was subjected to pressure bonding onto the white colored layer.

Thus, transfer materials 101 to 114 formed of the light shielding layer and the white colored layer shown in Table 5 described below in which the temporary support, the light shielding layer, and the white colored layer were integrated were prepared. The obtained transfer materials 101 to 114 were respectively set to transfer materials for forming a white decorative material of Examples 101 to 114.

TABLE 5

| Transfer Material | Configuration of Transfer Material | Black Coloring Liquid for Light Shielding Layer | White Coloring Liquid for White Colored Layer |
|---|---|---|---|
| Praparation Example 101 Transfer Material 101 | Light Shielding Layer White Colored Layer Lamination | Black Coloring Liquid 2 | White Coloring Liquid 1 |
| Praparation Example 102 Transfer Material 102 | Light Shielding Layer White Colored Layer Lamination | Black Coloring Liquid 2 | White Coloring Liquid 2 |
| Praparation Example 103 Transfer Material 103 | Light Shielding Layer White Colored Layer Lamination | Black Coloring Liquid 2 | White Coloring Liquid 3 |
| Praparation Example 104 Transfer Material 104 | Light Shielding Layer White Colored Layer Lamination | Black Coloring Liquid 2 | White Coloring Liquid 4 |
| Praparation Example 105 Transfer Material 105 | Light Shielding Layer White Colored Layer Lamination | Black Coloring Liquid 2 | White Coloring Liquid 5 |
| Praparation Example 106 Transfer Material 106 | Light Shielding Layer White Colored Layer Lamination | Black Coloring Liquid 2 | White Coloring Liquid 6 |
| Praparation Example 107 Transfer Material 107 | Light Shielding Layer White Colored Layer Lamination | Black Coloring Liquid 2 | White Coloring Liquid 7 |
| Praparation Example 108 Transfer Material 108 | Light Shielding Layer White Colored Layer Lamination | Black Coloring Liquid 2 | White Coloring Liquid 8 |
| Praparation Example 109 Transfer Material 109 | Light Shielding Layer White Colored Layer Lamination | Black Coloring Liquid 2 | White Coloring Liquid 9 |
| Praparation Example 110 Transfer Material 110 | Light Shielding Layer White Colored Layer Lamination | Black Coloring Liquid 2 | White Coloring Liquid 10 |
| Praparation Example 111 Transfer Material 111 | Light Shielding Layer White Colored Layer Lamination | Black Coloring Liquid 2 | White Coloring Liquid 11 |
| Praparation Example 112 Transfer Material 112 | Light Shielding Layer White Colored Layer Lamination | Black Coloring Liquid 2 | White Coloring Liquid 12 |
| Praparation Example 113 Transfer Material 113 | Light Shielding Layer White Colored Layer Lamination | Black Coloring Liquid 1 | White Coloring Liquid 2 |
| Praparation Example 114 Transfer Material 114 | Light Shielding Layer White Colored Layer Lamination | Black Coloring Liquid 3 | White Coloring Liquid 2 |

<Preparation of Substrate with Decorative Material (Example 101)>

As illustrated in FIG. 7, reinforced glass (300 mm×400 mm×0.7 mm) in which an opening portion (15 mmΦ) was formed was washed with a rotating brush having nylon hair while spraying a glass washing agent liquid of which the temperature was adjusted to 25° C. for 20 seconds by using a shower. The glass substrate was preheated at 90° C. for 2 minutes by using a substrate preheating device.

The transfer material 101 in which the light shielding layer white colored layer of Preparation Example 101 was laminated on the glass substrate described above was molded into the shape of a frame having a size corresponding to four sides of the glass substrate, and was transferred after removing the protective film. After that, the temporary support of the transfer material 101 was peeled off. In order to cure the light shielding layer and the white colored layer, the obtained film was heated on each glass substrate (each substrate) at 150° C. for 30 minutes, and at 240° C. for 30 minutes. Accordingly, a white substrate with a decorative material of Example 101 including the white decorative material formed by heating the white colored layer was obtained.

<Preparation of Substrate with Decorative Material (Examples 102 to 114)>

In Example 101, white substrates with a decorative material of Examples 102 to 114 in which the light shielding layer and the white colored layer were formed on the glass substrate were obtained by the same method as that in Example 101 except that the material of the used white coloring liquid for a white colored layer and the material of the used black coloring liquid for a light shielding layer were changed as shown in Table 5 described above.

<Evaluation>

An evaluation method of properties of the white substrates with a decorative material of each of the examples obtained as described above will be described below. In addition, the obtained results were shown in Table 6 described below.

(Measurement of Tapered Tilt Angle)

In the sectional surface of the obtained white substrate with a decorative material, a curve configuring a tilt surface of a tilt portion was approximated to a straight line, and the straight line was set to a tilt angle θ. The tilt angle θ was obtained from a result of observing the sectional shape by using an electronic microscope.

(Appearance Evaluation)

In the obtained white substrate with a decorative material, appearance evaluation based on the following criteria was performed. A level allowable for practical use is A and B.

A: In a case where the white substrate with a decorative material is visually observed from a side including the white decorative material, a retardation between the end portion of the white decorative material and the end portion of the light shielding layer is not able to be confirmed, and even in a case where the white substrate with a decorative material is visually observed from a side opposite to the side including the white decorative material, a portion having a low transmission density in the vicinity of the end portion of the white decorative material is not able to be confirmed.

B: In a case where the white substrate with a decorative material is visually observed from the side including the white decorative material, a retardation between the end portion of the white decorative material and the end portion of the light shielding layer is able to be confirmed, but even in a case where the white substrate with a decorative material is visually observed from the side opposite to the side including the white decorative material, the portion having a low transmission density in the vicinity of the end portion of the white decorative material is not able to be confirmed.

C: In a case where the white substrate with a decorative material is visually observed from the side including the white decorative material, a retardation between the end portion of the white decorative material and the end portion of the light shielding layer is able to be confirmed, and even in a case where the white substrate with a decorative material is visually observed from the side opposite to the side including the white decorative material, the portion having a low transmission density in the vicinity of the end portion of the white decorative material is able to be confirmed.

D: A part of the light shielding layer protrudes from the end portion of the white decorative material.

(ITO Conductivity)

A transparent electrode layer was formed in a portion including a tapered tilt portion on a substrate with a white decorative material by using the following method, and evaluation was performed according to the number of disconnections thereof.

((Formation of Transparent Electrode Layer))

The white substrates with a decorative material of each of the examples were introduced into a vacuum chamber, and an ITO thin film having a thickness of 40 nm was formed by DC magnetron sputtering (Conditions: Substrate Temperature of 250° C., Argon Pressure of 0.13 Pa, and Oxygen Pressure of 0.01 Pa) using an ITO target in which a content rate of $SnO_2$ is 10 mass % (Indium:Tin=95:5 (Molar Ratio)), and thus, a front plate was obtained in which a transparent electrode layer was formed. Surface electrical resistance of the ITO thin film was 80 Ω/square.

((Preparation of Transfer Film E1 for Etching))

A thermoplastic resin layer and an intermediate layer were formed on the temporary support by the following method.

A coating liquid for a thermoplastic resin layer formed of Formulation H1 described below was applied onto a polyethylene terephthalate film temporary support having a thickness of 75 μm by using a slit-like nozzle, and was dried. Next, a coating liquid for an intermediate layer formed of Formulation P1 described below was applied and dried.

—Coating Liquid for Thermoplastic Resin Layer: Formulation H1—

Methanol: 11.1 parts by mass

Propylene Glycol Monomethyl Ether Acetate: 6.36 parts by mass

Methyl Ethyl Ketone: 52.4 parts by mass

Methyl Methacrylate/2-Ethyl Hexyl Acrylate/Benzyl Methacrylate/Methacrylic Acid Copolymer (Copolymerization Compositional Ratio (Molar Ratio)=55/11.7/4.5/28.8, Molecular Weight=100,000, Tg≅70° C.): 5.83 parts by mass Styrene/Acrylic Acid Copolymer (Copolymerization Compositional Ratio (Molar Ratio)=63/37, Weight-Average Molecular Weight=10,000, Tg≅100° C.): 13.6 parts by mass Monomer (Product Name: BPE-500, manufactured by Shin Nakamura Chemical Co., Ltd.): 9.1 parts by mass Coating Auxiliary Agent (MEGAFAC F-780F, manufactured by DIC Corporation): 0.54 parts by mass Furthermore, a viscosity of the coating liquid H1 for a thermoplastic resin layer at 120° C. after removing a solvent was 1,500 Pa·sec.

—Coating Liquid for Intermediate Layer: Formulation P1—

Polyvinyl Alcohol: 32.2 parts by mass (Product Name: PVA205, manufactured by KURARAY CO., LTD., Degree of Saponification=88%, Degree of Polymerization of 550)

Polyvinyl Pyrrolidone: 14.9 parts by mass (Product Name: K-30, manufactured by Ashland Japan Co., Ltd.)

Distilled Water: 524 parts by mass

Methanol: 429 parts by mass (Preparation of Transfer Film E1 for Etching)

The coating liquid for a photocurable resin layer for etching formed of Formulation E1 described below was applied onto the substrate including the thermoplastic resin layer and the intermediate layer on the temporary support, and was dried. The protective film was subjected to pressure bonding thereon, and thus, a transfer film E1 for etching was obtained in which the temporary support, the thermoplastic resin layer, the intermediate layer (an oxygen blocking film), the photocurable resin layer for etching, and the protective film were integrated with each other (a film thickness of the photocurable resin layer for etching was 2.0 μm).

—Coating Liquid for Photocurable Resin Layer for Etching: Formulation E1—

Methyl Methacrylate/Styrene/Methacrylic Acid Copolymer (Copolymer Composition (Mass %): 31/40/29, Mass Average Molecular Weight of 60,000, and Acid Value of 163 mgKOH/g): 16 parts by mass Monomer 1 (Product Name: BPE-500, manufactured by Shin Nakamura Chemical Co., Ltd.): 5.6 parts by mass Adduct of 0.5 moles of Tetraethylene Oxide Monomethacrylate of Hexamethylene Diisocyanate: 7 parts by mass Cyclohexane Dimethanol Monoacrylate: 2.8 parts by mass 2-Chloro-N-Butyl Acridone: 0.42 parts by mass 2,2-Bis(o-Chlorophenyl)-4,4',5,5'-Tetraphenyl Biimidazole: 2.17 parts by mass Leuco Crystal Violet: 0.26 parts by mass Phenothiazine: 0.013 parts by mass Coating Auxiliary Agent (Product Name: MEGAFAC F-780F, manufactured by DIC Corporation): 0.03 parts by mass Methyl Ethyl Ketone: 40 parts by mass 1-Methoxy-2-Propanol: 20 parts by mass (Formation of Transparent Electrode Pattern)

The front plate in which the white decorative material, the light shielding layer, and the transparent electrode layer were formed was washed, and the transfer film E1 for etching from which the protective film was removed was laminated thereon (Substrate Temperature: 130° C., Rubber Roller Temperature of 120° C., Line Pressure of 100 N/cm, and Transport Speed of 2.2 m/minute). The temporary support was peeled off, and then, a distance between the surface of an exposure mask (a quartz exposure mask having a transparent electrode pattern) and the photocurable resin layer for etching described above was set to 200 μm, and pattern exposure was performed at an exposure amount of 50 mJ/cm$^2$ (an i line) in the shape of a stripe having a line width of 40 μm and the number of lines of 20.

Next, a treatment was performed at 25° C. for 100 seconds by using a triethanol amine-based developer (containing 30 mass % of triethanol amine, a liquid in which Product Name: T-PD2 (manufactured by FUJIFILM Corporation) was diluted 10 times with pure water), and a treatment was performed at 33° C. for 20 seconds by using a surfactant-containing washing liquid (a liquid in which Product Name: T-SD3 (manufactured by FUJIFILM Corporation) was diluted 10 times with pure water), and then, a residue in the thermoplastic resin layer and the intermediate layer was removed by using a rotating brush and an ultrahigh pressure washing liquid, and a postbaking treatment was performed at 130° C. for 30 minutes, and thus, a front plate was obtained in which the white decorative material, the light shielding layer, the transparent electrode layer, and a photocurable resin layer pattern for etching were formed.

The front plate in which the white decorative material, the light shielding layer, the transparent electrode layer, and the photocurable resin layer pattern for etching were formed was dipped in an etching tank into which an ITO etchant (an aqueous solution of a hydrochloric acid and potassium chloride, and a liquid temperature of 30° C.) was put, a treatment was performed for 100 seconds, and the transparent electrode layer in an exposed region which was not covered with the photocurable resin layer for etching was dissolved and removed, and thus, a front plate with a transparent electrode layer pattern including the decorative material, the light shielding layer, and the photocurable resin layer pattern for etching was obtained.

Next, the front plate with a transparent electrode layer pattern including the photocurable resin layer pattern for etching was dipped in a resist peeling tank into which a resist peeling liquid (N-methyl-2-pyrrolidone, monoethanol amine, and a surfactant (Product Name: SUFYNOL 465, manufactured by Air Products and Chemicals, Inc.), and a liquid temperature of 45° C.) was put, a treatment was performed for 200 seconds, and the photocurable resin layer for etching was removed, and thus, a front plate was obtained in which the white decorative material, the light shielding layer, and 20 stripe-like transparent electrode patterns disposed over both regions of the non-contact surface of the front plate described above (the surface of the glass substrate on a side on which the white colored layer was formed) and the surface of the light shielding layer described above on a side opposite to the glass substrate described above as illustrated in FIG. 5 were formed. In the transparent electrode pattern formed on the light shielding layer of the substrates with a decorative material of each of the example and the comparative examples prepared as described above, the presence or absence of disconnection was measured by prober inspection, and evaluation was performed on the basis of the following criteria. A level allowable for practical use is A.

A: In prepared 20 transparent electrode patterns, the number of disconnections was 0.

B: In prepared 20 transparent electrode patterns, it was confirmed that the number of disconnections was greater than or equal to 1.

TABLE 6

| | Transfer Material | Tilt Angle (Degrees) | Appearance Evaluation | ITO Conductivity |
|---|---|---|---|---|
| Example 101 | Preparation Example 101 | 15 | B | A |
| Example 102 | Preparation Example 102 | 25 | B | A |
| Example 103 | Preparation Example 103 | 33 | B | A |
| Example 104 | Preparation Example 104 | 42 | A | A |
| Example 105 | Preparation Example 105 | 52 | A | A |

TABLE 6-continued

| | Transfer Material | Tilt Angle (Degrees) | Appearance Evaluation | ITO Conductivity |
|---|---|---|---|---|
| Example 106 | Preparation Example 106 | 29 | B | A |
| Example 107 | Preparation Example 107 | 28 | B | A |
| Example 108 | Preparation Example 108 | 23 | B | A |
| Example 109 | Preparation Example 109 | 10 | B | A |
| Example 110 | Preparation Example 110 | 15 | B | A |
| Example 111 | Preparation Example 111 | 23 | B | A |
| Example 112 | Preparation Example 112 | 27 | B | A |
| Example 113 | Preparation Example 113 | 31 | B | A |
| Example 114 | Preparation Example 114 | 32 | B | A |

From Table 6 described above, in the white substrates with a decorative material prepared by Examples 101 to 114, visual quality was excellent and ITO conductivity was excellent since protrusion of the light shielding layer from the end portion of the white decorative material and a region having a low transmission density were not able to be confirmed, and thus, the white substrates with a decorative material prepared by Examples 101 to 114 were preferable as a white decorative material for a front plate integrated type touch panel.

Example 121: Preparation of Touch Panel

<Formation of First Transparent Electrode Pattern>
(Formation of Transparent Electrode Layer)
The white substrate with a decorative material of Example 101 was introduced into a vacuum chamber, and an ITO thin film having a thickness of 40 nm was formed by DC magnetron sputtering (Conditions: Substrate Temperature of 250° C., Argon Pressure of 0.13 Pa, and Oxygen Pressure of 0.01 Pa) using an ITO target in which a content rate of $SnO_2$ is 10 mass % (Indium:Tin=95:5 (Molar Ratio)), and thus, a front plate was obtained in which a transparent electrode layer was formed. Surface electrical resistance of the ITO thin film was 80 Ω/square.

(Formation of First Transparent Electrode Pattern)
The front plate in which the white decorative material, the light shielding layer, and the transparent electrode layer were formed was washed, and the transfer film E1 for etching from which the protective film was removed was laminated thereon (Substrate Temperature: 130° C., Rubber Roller Temperature of 120° C., Line Pressure of 100 N/cm, and Transport Speed of 2.2 m/minute). The temporary support was peeled off, and then, a distance between the surface of an exposure mask (a quartz exposure mask having a transparent electrode pattern) and the photocurable resin layer for etching described above was set to 200 μm, and pattern exposure was performed at an exposure amount of 50 mJ/cm² (an i line).

Next, a treatment was performed at 25° C. for 100 seconds by using a triethanol amine-based developer (containing 30 mass % of triethanol amine, a liquid in which Product Name: T-PD2 (manufactured by FUJIFILM Corporation) was diluted 10 times with pure water), and a treatment was performed at 33° C. for 20 seconds by using a surfactant-containing washing liquid (a liquid in which Product Name: T-SD3 (manufactured by FUJIFILM Corporation) was diluted 10 times with pure water), and then, a residue in the thermoplastic resin layer and the intermediate layer was removed by using a rotating brush and an ultrahigh pressure washing liquid, and a postbaking treatment was performed at 130° C. for 30 minutes, and thus, a front plate was obtained in which the white decorative material, the light shielding layer, the transparent electrode layer, and a photocurable resin layer pattern for etching were formed.

The front plate in which the white decorative material, the light shielding layer, the transparent electrode layer, and the photocurable resin layer pattern for etching were formed was dipped in an etching tank into which an ITO etchant (an aqueous solution of a hydrochloric acid and potassium chloride, and a liquid temperature of 30° C.) was put, a treatment was performed for 100 seconds, and the transparent electrode layer in an exposed region which was not covered with the photocurable resin layer for etching was dissolved and removed, and thus, a front plate with a transparent electrode layer pattern including the white layer, the light shielding layer, the photocurable resin layer pattern for etching was obtained.

Next, the front plate with a transparent electrode layer pattern including the photocurable resin layer pattern for etching was dipped in a resist peeling tank into which a resist peeling liquid (N-methyl-2-pyrrolidone, monoethanol amine, and a surfactant (Product Name: SUFYNOL 465, manufactured by Air Products and Chemicals, Inc.), and a liquid temperature of 45° C.) was put, a treatment was performed for 200 seconds, and the photocurable resin layer for etching was removed, and thus, a front plate was obtained in which the white layer, the light shielding layer, and a first transparent electrode pattern disposed over a region of the non-contact surface of the front plate described above (the surface of the glass substrate on a side on which the white decorative material was formed) and the surface of the light shielding layer described above as illustrated in FIG. 5 were formed.

<Formation of Insulating Layer>
(Preparation of Transfer Film W1 for Forming Insulating Layer)
In the preparation of the transfer film E1 for etching, by the same method as that in the preparation of the transfer film E1 for etching except that the coating liquid for a photocurable resin layer for etching described above was used instead of the coating liquid for forming an insulating layer formed of Formulation W1 described below, and thus, a transfer film W1 for forming an insulating layer was obtained in which the temporary support, the thermoplastic resin layer, the intermediate layer (an oxygen blocking film), the photocurable resin layer for an insulating layer, and the protective film were integrated with each other (a film thickness of the photocurable resin layer for an insulating layer was 1.4 μm).

—Coating Liquid for Forming Insulating Layer: Formulation W1—
  Binder 3 (1-Methoxy-2-Propanol of Glycidyl Methacrylate Adduct (d) of Cyclohexyl Methacrylate (a)/Methyl Methacrylate (b)/Methacrylic Acid Copolymer (c) (Composition (Mass %): a/b/c/d=46/1/10/43, Mass Average Molecular Weight: 36,000, Acid Value of 66 mgKOH/g), Methyl Ethyl Ketone Solution (Solid Content: 45%)): 12.5 parts by mass
  Propylene Glycol Monomethyl Ether Acetate Solution (76 mass %) of DPHA (Dipentaerythritol Hexaacrylate, manufactured by Nippon Kayaku Co., Ltd.): 1.4 parts by mass Urethane-Based Monomer (Product Name: NK OLIGO UA-32P, manufactured by Shin Nakamura Chemical Co., Ltd.: Non-Volatile Content of 75%, Propylene Glycol Monomethyl Ether Acetate: 25%): 0.68 parts by mass Tripentaerythritol Octaacrylate (Product Name: V#802, manufactured by OSAKA ORGANIC CHEMICAL INDUSTRY LTD.): 1.8 parts by mass Diethyl Thioxanthone: 0.17 parts by mass 2-(Dimethyl Amino)-2-[(4-Methyl Phenyl) Methyl]-1-[4-(4-Morpholinyl) Phenyl]-1-Butanone (Product Name: Irgacure379, manufactured by BASF SE): 0.17 parts by mass Dispersant (Product Name: SOLSPERSE 20000, manufactured by Nitto Denko Avecia Inc.): 0.19 parts by mass Surfactant (Product Name: MEGAFAC F-780F, manufactured by DIC Corporation): 0.05 parts by mass Methyl Ethyl Ketone: 23.3 parts by mass Propylene Glycol Monomethyl Ether Acetate: 59.8 parts by mass Furthermore, a viscosity of the coating liquid for forming an insulating layer W1 at 100° C. after removing a solvent was 4,000 Pa·sec.

The front plate with a white decorative material, a light shielding layer, and a first transparent electrode pattern described above was washed, and transfer film W1 for forming an insulating layer from which the protective film was removed was laminated thereon (Substrate Temperature: 100° C., Rubber Roller Temperature of 120° C., Line Pressure of 100 N/cm, and Transport Speed of 2.3 m/minute). The temporary support was peeled off, and then, a distance between the surface of an exposure mask (a quartz exposure mask having a pattern for an insulating layer) and the photocurable resin layer for an insulating layer described above was set to 100 µm, and pattern exposure was performed at an exposure amount of 30 mJ/cm$^2$ (an i line).

Next, a treatment was performed at 33° C. for 60 seconds by using a triethanol amine-based developer (containing 30 mass % of triethanol amine, a liquid in which Product Name: T-PD2 (manufactured by FUJIFILM Corporation) was diluted 10 times with pure water), a treatment was performed at 25° C. for 50 seconds by using a sodium carbonate/sodium hydrogen carbonate-based developer (a liquid in which Product Name: T-CD1 (manufactured by FUJIFILM Corporation) was diluted 5 times with pure water), and a treatment was performed at 33° C. for 20 seconds by using a surfactant-containing washing liquid (a liquid in which Product Name: T-SD3 (manufactured by FUJIFILM Corporation) was diluted 10 times with pure water), a residue was removed by using a rotating brush and an ultrahigh pressure washing liquid, and a postbaking treatment was performed at 230° C. for 60 minutes, and thus, a front plate was obtained in which the white decorative material, the light shielding layer, the first transparent electrode pattern, and an insulating layer pattern were formed.

<Formation of Second Transparent Electrode Pattern>

(Formation of Transparent Electrode Layer)

The front plate in which the white decorative material, the light shielding layer, the first transparent electrode pattern, and the insulating layer pattern were formed was subjected to a DC magnetron sputtering treatment (Conditions: Substrate Temperature of 50° C., Argon Pressure of 0.13 Pa, and Oxygen Pressure of 0.01 Pa), and an ITO thin film having a thickness of 80 nm was formed by the same method as that in the formation of the first transparent electrode pattern, and thus, a front plate was obtained in which the white decorative material, the light shielding layer, the first transparent electrode pattern, the insulating layer pattern, and the transparent electrode layer were formed. Surface electrical resistance of the ITO thin film was 110 Ω/square.

A front plate was obtained in which the white decorative material, the light shielding layer, the first transparent electrode pattern, the insulating layer pattern, the transparent electrode layer, and the photocurable resin layer for etching pattern were formed by the same method as that in the formation of the first transparent electrode pattern and by using the transfer film E1 for etching (Postbaking Treatment; at 130° C. for 30 minutes).

Further, etching was performed (at 30° C. for 50 seconds), and the photocurable resin layer for etching was removed (at 45° C. for 200 seconds) by the same method as that in the formation of the first transparent electrode pattern, and thus, a front plate was obtained in which the white decorative material, the light shielding layer, the first transparent electrode pattern, the insulating layer pattern, and a second transparent electrode pattern disposed over both regions of the non-contact surface of the front plate described above and the surface of the light shielding layer described above on a side opposite to the front plate described above as illustrated in FIG. 5 were formed.

<Formation of Conductive Element Different from First Transparent Electrode Pattern and Second Transparent Electrode Pattern>

The front plate in which the white decorative material, the light shielding layer, the first transparent electrode pattern, the insulating layer pattern, and the second transparent electrode pattern were formed was subjected to a DC magnetron sputtering treatment by the same method as that in the formation of the first transparent electrode pattern and the second transparent electrode pattern, and thus, a front plate was obtained in which an aluminum (Al) thin film having a thickness of 200 nm was formed.

A front plate was obtained in which the white decorative material, the light shielding layer, the first transparent electrode pattern, the insulating layer pattern, the second transparent electrode pattern, the aluminum thin film, and a photocurable resin layer pattern for etching were formed by the same method as that in the formation of the first transparent electrode pattern and the second transparent electrode pattern and by using the transfer film E1 for etching (Postbaking Treatment; at 130° C. for 30 minutes).

Further, etching was performed (at 30° C. for 50 seconds), and the photocurable resin layer for etching was removed (at 45° C. for 200 seconds) by the same method as that in the formation of the first transparent electrode pattern, and thus, a front plate was obtained in which the white decorative material, the light shielding layer, the first transparent electrode pattern, the insulating layer pattern, the second transparent electrode pattern, and a conductive element different from the first transparent electrode pattern and the second transparent electrode pattern were formed.

<Formation of Transparent Protective Layer>

The transfer film W1 for forming an insulating layer from which the protective film was removed was laminated on the front plate in which the white decorative material, the light shielding layer, the first transparent electrode pattern, the insulating layer pattern, the second transparent electrode pattern, and the conductive element different from the first transparent electrode pattern and the second transparent electrode pattern were formed by the same method as that in the formation of the insulating layer, the temporary support was peeled off, and then, entire surface exposure was performed at an exposure amount of 50 mJ/cm$^2$ (an i line)

without using an exposure mask, and development, postexposure (1,000 mJ/cm²), and a postbaking treatment were performed, and thus, a front plate was obtained in which the insulating layer (the transparent protective layer) was laminated to cover all of the white decorative material, the light shielding layer, the first transparent electrode pattern, the insulating layer pattern, the second transparent electrode pattern, the conductive element different from the first transparent electrode pattern and the second transparent electrode pattern as illustrated in FIG. 5. The obtained front plate is able to be used as a capacitance type input device.

<Preparation of Image Display Device (Touch Panel)>

The front plate manufactured as described above (the capacitance type input device) was bonded to a liquid crystal display element manufactured by a method disclosed in paragraphs <0097> to <0119> of JP2009-47936A, and an image display device of Example 121 including the capacitance type input device as a constituent was prepared by a known method.

<Total Evaluation of Front Plate and Image Display Device>

The front plate (the capacitance type input device), in which the white decorative material, the light shielding layer, the first transparent electrode pattern, the insulating layer pattern, the second transparent electrode pattern, and the conductive element different from the first transparent electrode pattern and the second transparent electrode pattern were formed in each of the steps described above, was easy to wash, the opening portion and the back surface being not contaminated. There was no problem in the contamination of other members.

In addition, in the white decorative material, a pin hole was not formed, and there was no problem in whiteness and unevenness. Similarly, in the light shielding layer, a pin hole was not formed, and light shielding properties were excellent.

Therefore, there is no problem in conductivity of each of the first transparent electrode pattern, the second transparent electrode pattern, and the conductive element different from the first transparent electrode pattern and the second transparent electrode pattern. The insulating properties was provided between the first transparent electrode pattern and the second transparent electrode pattern.

Further, even in the transparent protective layer, a defect such as air bubbles did not occur, and an image display device having excellent display properties and excellent operating properties was obtained.

EXPLANATION OF REFERENCES

1: substrate (film substrate, only film substrate may be front plate)
1G: glass (cover glass, only cover glass may be front plate or laminate of substrate and glass may be front plate)
2a: decorative material
2b: light shielding layer
2c: tilt portion
3: conductive layer (first transparent electrode pattern)
3a: pad portion
3b: connection portion
4: conductive layer (second electrode pattern)
5: insulating layer
6: conductive layer (other conductive element)
7: transparent protective layer
8: opening portion
10: capacitance type input device
11: reinforced glass
C: first direction
D: second direction

What is claimed is:

1. A pigment dispersion liquid, containing:

a pigment dispersant; and a pigment, wherein the pigment dispersant is a graft type silicone polymer denoted by General Formula 3 described below,

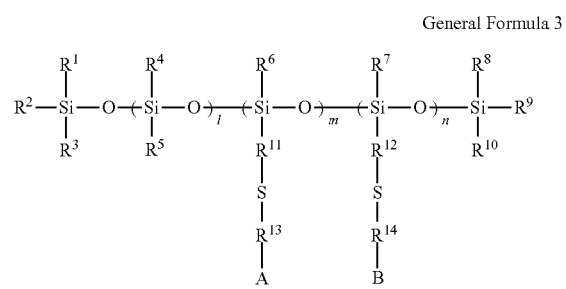

General Formula 3 in General Formula 3, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, $R^{13}$ and $R^{14}$ each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 0, and

General Formula 2 in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

2. The pigment dispersion liquid according to claim 1, wherein in General Formula 3 described above, m represents an integer of greater than or equal to 1.

3. The pigment dispersion liquid according to claim 1, wherein the pigment dispersant is a graft type silicone polymer denoted by General Formula 4 described below, General Formula 4

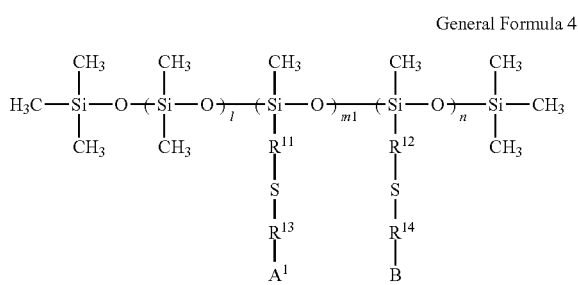

in General Formula 4, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption portion which includes at least one of a portion selected from an acidic group, a group having a basic nitrogen atom, a urea group, a urethane group, a group having a coordinating oxygen atom, a hydrocarbon group having greater than or equal to 4 carbon atoms, a heterocyclic residue, an amide group, an alkoxy silyl group, an epoxy group, an isocyanate group, a hydroxy group, and a thiol group, B represents a group having a structure denoted by General Formula 2 described below, and l, m1, and n each independently represent an integer of greater than or equal to 1, and General Formula 2

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

4. The pigment dispersion liquid according to claim 1, wherein the pigment is a white pigment or a black pigment.

5. The pigment dispersion liquid according to claim 1, wherein the pigment is titanium dioxide or carbon black.

6. The pigment dispersion liquid according to claim 1, wherein a content rate of the pigment with respect to the pigment dispersion liquid is 20 to 90 mass %.

7. The pigment dispersion liquid according to claim 1, further containing:
a silicone resin.

8. The pigment dispersion liquid according to claim 1, wherein the pigment dispersion liquid is used for forming a decorative material.

9. A decorative material using the pigment dispersion liquid according to claim 1.

10. The decorative material according to claim 9, wherein the decorative material is used for a touch panel, and is a white decorative material.

11. A substrate with a decorative material, comprising:
the decorative material according to claim 9; and
a substrate.

12. A touch panel, comprising:
the substrate with a decorative material according to claim 11.

13. A touch panel, comprising:
the decorative material according to claim 9.

14. An information display device, comprising:
the touch panel according to claim 13.

15. A transfer material for forming a decorative material, comprising:
a colored layer using the pigment dispersion liquid according to claim 1.

16. A touch panel, comprising:
a decorative material using the transfer material for forming a decorative material according to claim 15.

17. A graft type silicone polymer denoted by General Formula 4 described below,

General Formula 4

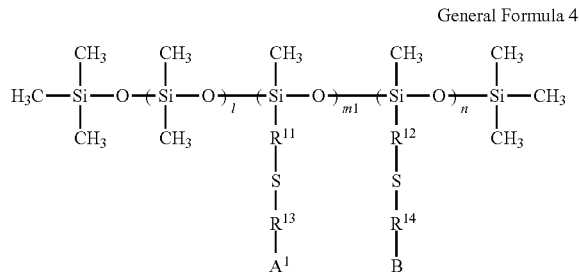

in General Formula 4, $R^{11}$ and $R^{12}$ each independently represent an arylene group or an alkylene group having 1 to 3 carbon atoms, $R^{13}$ and $R^{14}$ each independently represent a single bond or a divalent organic linking group, $A^1$ represents a group having a pigment adsorption portion which includes at least one of a portion selected from an acidic group, a group having a basic nitrogen atom, a urea group, a urethane group, a group having a coordinating oxygen atom, a hydrocarbon group having greater than or equal to 4 carbon atoms, a heterocyclic residue, an amide group, an alkoxy silyl group, an epoxy group, an isocyanate group, a hydroxy group, and a thiol group, B represents a group having a structure denoted by General Formula 2 described below, and l, m1, and n each independently represent an integer of greater than or equal to 1, and General Formula 2

in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

18. A pigment dispersion liquid, containing:
a pigment dispersant; and
a pigment,
wherein the pigment dispersant is a graft type silicone polymer denoted by General Formula 1 described below,

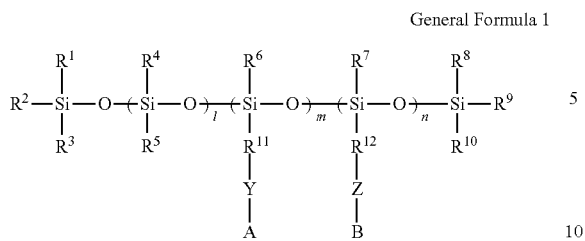

General Formula 1 in General Formula 1, $R^1$, $R^2$, $R^3$, $R^4$, $R^5$, $R^6$, $R^7$, $R^8$, $R^9$, and $R^{10}$ each independently represent a hydrogen atom, a hydroxy group, an aryl group, or an alkyl group having 1 to 3 carbon atoms, $R^{11}$ and $R^{12}$ each independently represent an arylene group or an alkylene group having 1 to 3 carbon atoms, Y and Z each independently represent a single bond or a divalent organic linking group, A represents a group having a pigment adsorption portion, B represents a group having a structure denoted by General Formula 2 described below, l and n each independently represent an integer of greater than or equal to 1, and m represents an integer of greater than or equal to 1, and

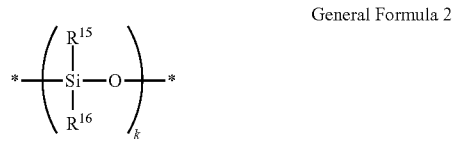

General Formula 2 in General Formula 2, $R^{15}$ and $R^{16}$ each independently represent a hydrogen atom, a hydroxy group, an aryl group, or an alkyl group having 1 to 3 carbon atoms, and k represents an integer of greater than or equal to 1.

* * * * *